US012113205B2

(12) United States Patent
Hayashi

(10) Patent No.: US 12,113,205 B2
(45) Date of Patent: Oct. 8, 2024

(54) NEGATIVE ELECTRODE ACTIVE MATERIAL, NEGATIVE ELECTRODE, AND SECONDARY BATTERY

(71) Applicant: MURATA MANUFACTURING CO., LTD., Kyoto (JP)

(72) Inventor: Naoki Hayashi, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 556 days.

(21) Appl. No.: 17/533,439

(22) Filed: Nov. 23, 2021

(65) Prior Publication Data

US 2022/0085355 A1    Mar. 17, 2022

Related U.S. Application Data

(63) Continuation of application No. PCT/JP2020/025340, filed on Jun. 26, 2020.

(30) Foreign Application Priority Data

Jun. 26, 2019 (JP) .................................. 2019-118719

(51) Int. Cl.
| | | |
|---|---|---|
| H01M 4/36 | (2006.01) | |
| H01M 4/02 | (2006.01) | |
| H01M 4/38 | (2006.01) | |
| H01M 4/587 | (2010.01) | |
| H01M 4/62 | (2006.01) | |
| H01M 10/0525 | (2010.01) | |

(52) U.S. Cl.
CPC ........... *H01M 4/364* (2013.01); *H01M 4/366* (2013.01); *H01M 4/386* (2013.01); *H01M 4/587* (2013.01); *H01M 4/624* (2013.01); *H01M 10/0525* (2013.01); *H01M 2004/027* (2013.01)

(58) Field of Classification Search
CPC ...... H01M 4/364; H01M 4/366; H01M 4/362; H01M 4/386
See application file for complete search history.

(56) References Cited

U.S. PATENT DOCUMENTS

| | | |
|---|---|---|
| 2017/0040599 A1 | 2/2017 | Kamo et al. |
| 2017/0271723 A1 | 9/2017 | Huang |
| 2018/0145312 A1 | 5/2018 | Koike et al. |

FOREIGN PATENT DOCUMENTS

| | | |
|---|---|---|
| CN | 107195867 A | 9/2017 |
| CN | 107925059 | 4/2018 |

(Continued)

OTHER PUBLICATIONS

Chinese Office Action issued Nov. 29, 2023 in corresponding Chinese Application No. 202080039545.7.

(Continued)

*Primary Examiner* — Basia A Ridley
*Assistant Examiner* — Heng M. Chan
(74) *Attorney, Agent, or Firm* — K&L Gates LLP

(57) ABSTRACT

The negative electrode active material includes a plurality of first negative electrode active material particles. Each of the first negative electrode active material particles includes a central portion including silicon and a covering portion provided on a surface of the central portion. The covering portion includes a (meth)acrylic acid-based polymer and a compound having a siloxane bond. The (meth)acrylic acid-based polymer includes at least one of poly(meth)acrylate or a derivative of poly(meth)acrylic acid.

17 Claims, 5 Drawing Sheets

(56) References Cited

FOREIGN PATENT DOCUMENTS

| JP | 2002008657 A | 1/2002 |
| JP | 2015156328 A | 8/2015 |
| JP | 2016066506 A | 4/2016 |
| WO | 2017026269 A1 | 2/2017 |

OTHER PUBLICATIONS

International Search Report for Application No. PCT/JP2020/025340, dated Sep. 15, 2020.
Japanese Office Action issued Jun. 7, 2022 in corresponding Japanese Application No. 2021-52779.

$Q_4$ : -107ppm    $Q_3$ : -93ppm $Q_2$ : -75ppm    $Q_1$ : -67ppm $Q_0$ : -64ppm

NEGATIVE ELECTRODE ACTIVE MATERIAL, NEGATIVE ELECTRODE, AND SECONDARY BATTERY

CROSS REFERENCE TO RELATED APPLICATIONS

The present application is a continuation of PCT patent application no. PCT/JP2020/025340, filed on Jun. 26, 2020, which claims priority to Japanese patent application no. JP2019-118719 filed on Jun. 26, 2019, the entire contents of which are being incorporated herein by reference.

BACKGROUND

The present disclosure relates to a negative electrode active material, a negative electrode, and a secondary battery.

In recent years, there has been an urgent need of developing technique to increase a capacity of a secondary battery. As a negative electrode active material attaining a higher capacity than carbon-based materials, Si-based materials has attracted attention.

SUMMARY

The present disclosure relates to a negative electrode active material, a negative electrode, and a In recent years, batteries have been used as power sources for various electronic devices, electric vehicles, and the like, and thus it is desired to improve cycle characteristics, and charge and discharge efficiency in order to further improve characteristics.

An object of the present disclosure is to provide a negative electrode active material, a negative electrode, and a secondary battery, capable of improving cycle characteristics, and charge and discharge efficiency.

According to an embodiment of the present disclosure, a negative electrode active material is provided. The negative electrode active material includes a plurality of first negative electrode active material particles, each including a central portion containing silicon, and a covering portion provided on a surface of the central portion. The covering portion includes a (meth)acrylic acid-based polymer and a compound having a siloxane bond, in which the (meth)acrylic acid-based polymer includes at least one of poly(meth)acrylate or a derivative of poly(meth)acrylic acid.

According to an embodiment of the present disclosure, a negative electrode is provided. The negative electrode includes the negative electrode active material according to an embodiment as described herein.

According to an embodiment of the present disclosure, a secondary battery is provided. The secondary battery includes a positive electrode, a negative electrode, and an electrolyte, in which the negative electrode includes the negative electrode active material according to an embodiment as described herein.

According to an embodiment of the present disclosure, (meth)acrylic acid may include at least one of acrylic acid and methacrylic acid. More specifically, a (meth)acrylic acid-based polymer may include at least one of an acrylic acid polymer and/or a methacrylic acid polymer. A poly(meth)acrylate may include at least one of a polyacrylate and/or a polymethacrylate. A derivative of poly(meth)acrylic acid may include at least one of a derivative of polyacrylic acid and/or a derivative of polymethacrylic acid.

According to an embodiment of the present disclosure, when a (meth)acrylic acid-based polymer may include an acrylic acid-based polymer and/or a methacrylic acid-based polymer, the content of the (meth)acrylic acid-based polymer may include the total content of the acrylic acid-based polymer and the methacrylic acid-based polymer.

According to the present disclosure, cycle characteristics, and charge and discharge efficiency can be improved.

The effects described in the present disclosure are merely exemplary and are not limited, and there may be additional effects.

DETAILED DESCRIPTION

As described herein, the present disclosure will be described based on examples with reference to the drawings, but the present disclosure is not to be considered limited to the examples, and various numerical values and materials in the examples are considered by way of example.

Figure 1:
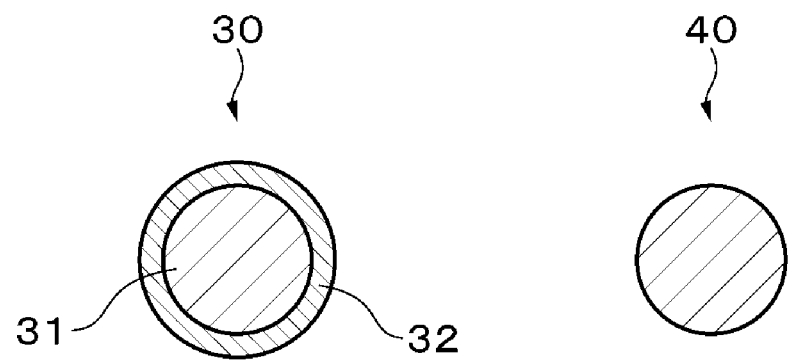
FIG. 1 is a sectional view schematically illustrating an example of a configuration of each of a first negative electrode active material particle and a second negative electrode active material particle according to an embodiment of the present disclosure.

First, an example of a configuration of a negative electrode active material according to a first embodiment of the present disclosure will be described with reference to FIG. 1. The negative electrode active material is used for a nonaqueous electrolyte secondary battery (for example, a lithium ion secondary battery), and contains a first negative electrode active material and a second negative electrode active material. The first negative electrode active material contains a plurality of first negative electrode active material particles 30. The second negative electrode active material contains a plurality of second negative electrode active material particles 40. FIG. 1 illustrates only one first negative electrode active material particle 30 and only one second negative electrode active material particle 40.

The reason why the negative electrode active material contains the first negative electrode active material and the second negative electrode active material is that a negative electrode 22 is less likely to expand and contract during charge and discharge while securing a high theoretical capacity. More specifically, as described later, the first negative electrode active material particles 30 each contain a silicon-containing material, and the second negative electrode active material particles 40 each contain a carbon-containing material. The silicon-containing material has an advantage of having a high theoretical capacity, but has a concern that it is likely to expand and contract during charge and discharge. On the other hand, the carbon-containing material has an advantage that it is less likely to expand and contract during charge and discharge, but has a concern of having a low theoretical capacity. By simultaneously using the first negative electrode active material and the second negative electrode active material, a high theoretical capacity can be obtained while expansion and contraction of the negative electrode 22 is suppressed during charge and discharge.

The ratio (mass ratio) of the mass of the first negative electrode active material to the sum of the mass of the first negative electrode active material and the mass of the second negative electrode active material is preferably 10 mass % or more and 50 mass % or less, more preferably 10 mass % or more and 40 mass % or less, and still more preferably 10 mass % or more and 30 mass % or less. This is because when the ratio accounted for by the mass of the first negative electrode active material is 10 mass % or more and 50 mass % or less, the above-described advantage of simultaneously using the first negative electrode active material and the second negative electrode active material can be sufficiently obtained. It should be understood that the mass ratio is calculated by: mass ratio (mass %)=[mass of the first negative electrode active material/(mass of the first negative electrode active material+mass of the second negative electrode active material)]×100.

As illustrated in FIG. 1, the first negative electrode active material particle 30 includes a central portion 31 and a covering portion 32.

The central portion 31 contains a silicon-containing material. Here, the silicon-containing material collectively refers to materials containing silicon as a constituent element. However, the silicon-containing material may contain only silicon as a constituent element. It should be understood that the number of types of the silicon-containing material may be only one, or two or more. The reason why the central portion 31 contains the silicon-containing material is that a high energy density can be obtained due to the silicon-containing material having excellent ability to occlude and release lithium.

The silicon-containing material can form an alloy with lithium, and may be a single substance of silicon, an alloy of silicon, a compound of silicon, a mixture of two or more of these, or a material containing one, or two or more phases thereof. In addition, the silicon-containing material may be crystalline or amorphous, or may contain both a crystalline portion and an amorphous portion. However, the single substance described herein merely means a general single substance, and thus may contain a trace amount of impurities. That is, the purity of the single substance is not necessarily limited to 100%.

The alloy of silicon contains, for example, any one of, or two or more of tin, nickel, copper, iron, cobalt, manganese, zinc, indium, silver, titanium, germanium, bismuth, antimony, chromium, and the like, as a constituent element other than silicon. The compound of silicon contains, for example, any one of, or two or more of carbon, oxygen, and the like as a constituent element other than silicon. It should be understood that the compound of silicon may contain, for example, any one of, or two or more of a series of constituent elements described for the alloy of silicon, as a constituent element other than silicon.

Specifically, examples of the alloy of silicon and the compound of silicon include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $CuSi$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, and $SiO_v$ ($0<v\leq2$). However, the range of v can be discretionarily set, and may be, for example, $0.2<v<1.4$.

The covering portion 32 is provided on a part or the whole of the surface of the central portion 31. That is, the covering portion 32 may cover only a part of the surface of the central portion 31, or may cover the whole of the surface of the central portion 31. When the covering portion 32 covers a part of the surface of the central portion 31, a plurality of the covering portions 32 may be present on the surface of the central portion 31.

The covering portion 32 contains a first compound and a second compound. The number of types of the first compound may be only one, or two or more. The number of types of the second compound may be only one, or two or more.

The thickness, the coverage ratio, and the like of the covering portion 32 can be discretionarily set. The thickness of the covering portion 32 is preferably a thickness capable of physically and chemically protecting the central portion 31 without inhibiting lithium ions from entering into and exit from the central portion 31. The same applies to the coverage ratio.

The first compound is a (meth)acrylic acid-based polymer. The (meth)acrylic acid-based polymer contains at least one of poly(meth)acrylate and a derivative of poly(meth)acrylic acid. By the covering portion 32 containing the first compound, the active site of the central portion 31 with the electrolytic solution is reduced, and reductive decomposition of the electrolytic solution is suppressed. Therefore, cycle characteristics are improved.

The poly(meth)acrylate and the derivative of poly(meth)acrylic acid are polymers that are water-soluble and are hardly dissolved in N-methyl-2-pyrrolidone (NMP) or the like used as a solvent at the time of producing the negative electrode. On the other hand, poly(meth)acrylic acid is a polymer that is also dissolved in NMP or the like used as the solvent in producing the negative electrode. Therefore, in a case in which NMP is used as the solvent for producing the negative electrode, the covering state of the covering portion 32 cannot be maintained when poly(meth)acrylic acid is used as the first compound. Therefore, in a case in which NMP or the like is used as the solvent for producing the negative electrode, it is difficult to use poly(meth)acrylic acid as the first compound.

The poly(meth)acrylate contains, for example, at least one of a metal salt, an onium salt, and the like. However, the poly(meth)acrylate described herein is not limited to a compound in which all carboxyl groups (—COOH) contained in poly(meth)acrylic acid form a salt, and may be a compound in which some of the carboxyl groups contained in the poly(meth)acrylic acid form a salt. That is, the latter poly(meth)acrylate may contain one, or two or more carboxyl groups.

Examples of the type of metal ion contained in the metal salt include an alkali metal ion and an alkaline earth metal ion. Examples of the alkali metal ion include a lithium ion, a sodium ion, and a potassium ion. Examples of the alkaline earth metal ion include a magnesium ion and a calcium ion. Specifically, examples of the poly(meth)acrylate include lithium poly(meth)acrylate, sodium poly(meth)acrylate, potassium poly(meth)acrylate, magnesium poly(meth)acrylate, and calcium poly(meth)acrylate.

Examples of the type of onium ion contained in the onium salt include an ammonium ion and a phosphonium ion. Specifically, examples of the poly(meth)acrylate include ammonium poly(meth)acrylate and phosphonium poly(meth)acrylate.

It should be understood that the poly(meth)acrylate may contain only metal ions, only onium ions, or both ions in one molecule. Also in this case, the poly(meth)acrylate may contain one, or two or more carboxyl groups as described above.

The polyacrylate is represented by, for example, the following Formula (1A).

[Chemical Formula 1A]

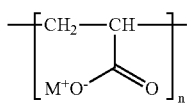

(1A)

(In Formula (1A), $M^+$ represents a metal ion or an onium ion. The metal ion is at least one of an alkali metal ion and an alkaline earth metal ion. The alkali metal ion is at least one of the above-described alkali metal ions. The alkaline earth metal ion is at least one of the above-described alkaline earth metal ions. The onium ion is at least one of the above-described onium ions. However, all $M^+$ contained in the polyacrylate may be the same ion, or a group of the $M^+$ may include two or more types of ions.)

The polymethacrylate is represented by, for example, the following Formula (1B).

[Chemical Formula 1B]

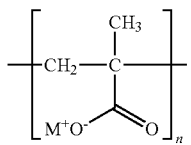

(1B)

(In Formula (1B), $M^+$ represents a metal ion or an onium ion. The metal ion is at least one of an alkali metal ion and an alkaline earth metal ion. The alkali metal ion is at least one of the above-described alkali metal ions. The alkaline earth metal ion is at least one of the above-described alkaline earth metal ions. The onium ion is at least one of the above-described onium ions. However, all $M^+$ contained in the polymethacrylate may be the same ion, or a group of the $M^+$ may include two or more types of ions.)

The derivative of poly(meth)acrylic acid is a compound in which a carboxyl group (—COOH) contained in poly(meth)acrylic acid is substituted with a substituent. The substituent is, for example, at least one of an amide group (—CONH$_2$), a cyano group (—CN), a formyl group (—CHO), and an optionally substituted ester group having 1 to 20 carbon atoms or 1 to 10 carbon atoms. However, the derivative of poly(meth)acrylic acid described herein is not limited to a compound in which all carboxyl groups contained in poly(meth)acrylic acid are substituted with substituents, and may be a compound in which some of the substituents contained in the poly(meth)acrylic acid are substituted. That is, the latter derivative of poly(meth)acrylic acid may contain one, or two or more carboxyl groups.

Examples of the derivative of poly(meth)acrylic acid include poly(meth)acrylic acid amide, poly(meth)acrylonitrile, poly(meth)acrolein, and poly(meth)acrylic acid ester. In addition, the derivative of poly(meth)acrylic acid may be a copolymer using two or more of polyacrylic acid and monomers that form the basis of the derivative of the above-described polyacrylic acid (that is, (meth)acrylic acid, (meth)acrylic acid amide, (meth)acrylonitrile, (meth)acrolein, (meth)acrylic acid ester, and the like).

The derivative of polyacrylic acid is represented by, for example, the following Formula (2A).

[Chemical Formula 2A]

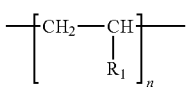

(2A)

(In Formula (2A), $R_1$ represents an amide group (—CONH$_2$), a cyano group (—CN), a formyl group (—CHO), or an optionally substituted ester group having 1 to 20 carbon atoms or 1 to 10 carbon atoms. However, all $R_1$ contained in the derivative of polyacrylic acid may be the same substituent, or a group of the $R_1$ may include two or more types of substituents.)

The derivative of polymethacrylic acid is represented by, for example, the following Formula (2B).

[Chemical Formula 2B]

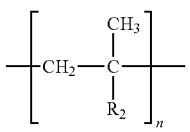

(2B)

(In Formula (2B), $R_2$ represents an amide group (—CONH$_2$), a cyano group (—CN), a formyl group (—CHO), or an optionally substituted ester group having 1 to 20 carbon atoms or 1 to 10 carbon atoms. However, all $R_2$ contained in the derivative of polymethacrylic acid may be the same substituent, or a group of the $R_2$ may include two or more types of substituents.)

The content of the first compound in the first negative electrode active material is preferably 0.1 mass % or more and 10 mass % or less. When the content of the first compound is 0.1 mass % or more, the active site of the central portion 31 with the electrolytic solution is more effectively reduced, and the reductive decomposition of the electrolytic solution is more effectively suppressed. Therefore, cycle characteristics are further improved. On the other hand, when the content of the first compound is more than 10 mass %, the amount of coverage of the first negative electrode active material particle 30 by the first compound becomes excessive, and the covering resistance increases. Therefore, charge and discharge capacity (for example, initial charge and discharge capacity) decreases. In addition, the content of the central portion 31 (silicon-containing material) in the first negative electrode active material particle 30 decreases, and the energy density decreases.

The above-described content of the first compound is determined as follows. Using a thermogravimetric-differential thermal analyzer (TG-DTA, for example, Rigaku Thermo plus TG8120 manufactured by Rigaku Corporation), several to several tens mg of a sample (the negative electrode active material) is heated to 600° C. in an air atmosphere at a rate of temperature increase of 1 to 5° C./min, and by using the weight loss amount at that time, the content of the first negative electrode active material and the first compound both of which in the negative electrode active material is determined. By using the content of the first negative electrode active material and the first compound, the content of the first compound in the first negative electrode active material is determined.

The second compound is a compound having a siloxane bond (hereinafter, referred to as a "siloxane compound"). By the covering portion 32 containing a siloxane compound, ionic conductivity is imparted to the covering portion 32. Therefore, charge and discharge efficiency (for example, initial charge and discharge efficiency) is improved. When the covering portion 32 contains only the second compound, the effect of improving cycle characteristics is hardly exhibited. On the other hand, by the covering portion 32 containing the second compound together with the first compound, cycle characteristics can be improved as compared with the case in which the covering portion 32 contains only the first compound.

Figure 6:
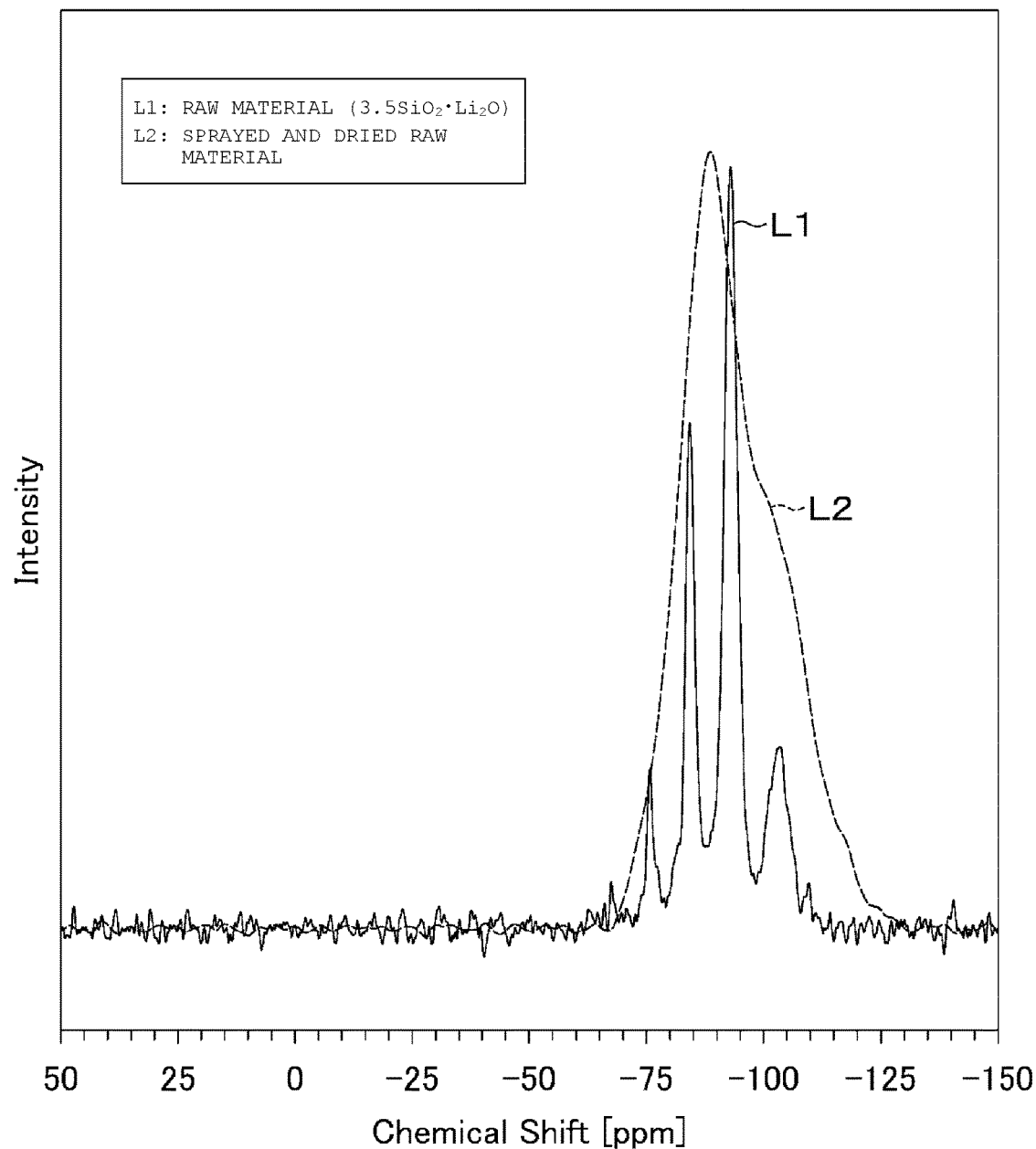
FIG. 6 is a graph illustrating an NMR spectrum of $^{29}$Si in a covering portion of a first negative electrode active material used in a battery of Example 1.

It is possible to confirm that the covering portion 32 contains the siloxane compound as the second compound by, for example, acquiring an NMR spectrum of $^{29}Si$ in the covering portion 32 (see FIG. 6). By using the CP/MAS method as the NMR measurement method, whether the siloxane compound is contained can be qualitatively analyzed with a small amount of coverage.

The siloxane compound may be linear, branched with one, or two or more side chains or the like, cyclic with one, or two or more rings, or net-like, or include a combination of two or more of these structures.

The siloxane compound contains, for example, at least one selected from structural units represented by the following Formulas (3A), (3B), (3C), and (3D). The net-like siloxane compound includes, for example, a structural unit represented by the following (3D) and has a halogen group or a hydrogen group at the terminal. The structural units represented by the following Formulas (3A), (3B), (3C), and (3D) are generally referred to as an M unit, a D unit, a T unit, and a Q unit, respectively.

[Chemical Formula 3A]

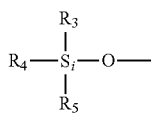

(3A)

(In Formula (3A), $R_3$, $R_4$, and $R_5$ are monovalent groups. Terminals of $R_3$, $R_4$, and $R_5$ are each a halogen group or a hydrogen group.)

[Chemical Formula 3B]

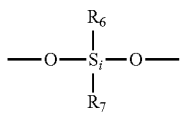

(3B)

(In Formula (3B), $R_6$ and $R_7$ are monovalent groups. Terminals of $R_6$ and $R_7$ are each a halogen group or a hydrogen group.)

[Chemical Formula 3C]

(3C)

(In Formula (3C), $R_8$ is a monovalent group. The terminal of $R_8$ is a halogen group or a hydrogen group.)

[Chemical Formula 3D]

(3D)

When the Formulas (3A), (3B), (3C), and (3D) include a halogen group, the halogen group is, for example, a fluorine group (—F), a chlorine group (—Cl), a bromine group (—Br) or an iodine group (—I), and preferably a fluorine group (—F).

The content of the second compound in the first negative electrode active material is preferably 0.1 mass % or more and 10 mass % or less. When the content of the second compound is 0.1 mass % or more, ionic conductivity is more effectively imparted to the covering portion 32. Therefore, charge and discharge efficiency (for example, initial charge and discharge efficiency) is further improved. On the other hand, when the content of the second compound is more than 10 mass %, the content of the central portion 31 (silicon-containing material) in the first negative electrode active material particle 30 decreases, and the energy density decreases.

The above-described content of the second compound is determined by measuring an NMR spectrum of $^{29}Si$ in the covering portion 32.

The covering portion 32 preferably further contains a conductive material together with the first compound and the second compound both of which are described above. By the covering portion 32 further containing the conductive material, the conductivity of the covering portion 32, that is, the conductivity of the surface of the first negative electrode active material particle 30 is improved. In addition, the covering portion 32 contains the conductive material, making it possible to strengthen the connection between composite particles or secondary particles formed by a plurality of the first negative electrode active material particles 30, suppress the collapse of the negative electrode active material due to expansion and contraction, and maintain the conductive network. Further, the conductive material plays a role of reducing the resistance increased by the first compound which is a polymer ((meth)acrylic acid-based polymer), and particularly has an effect of reducing the resistance inside the composite particle. Therefore, cycle characteristics are further improved. The number of types of the conductive material may be only one, or two or more.

The conductive material is, for example, a carbon-based material. The carbon-based material includes, for example, at least one of carbon nanotubes (for example, SWCNT, MWCNT, and the like), carbon nanofibers, fullerene, graphene, carbon black (for example, Ketjen black, acetylene black, and the like), graphite (for example, scaly graphite), vapor grown carbon fibers (VGCF), carbon microcoils, and carbon nanohorns. Among the above-described carbon-based materials, particularly preferred are carbon nanotubes, and more preferred are the carbon nanotubes having a small tube diameter. When the conductive material contains carbon nanotubes, the above-described effect of containing the conductive material can be exhibited with a smaller content, whereby the content of the conductive material can be reduced.

The content of the conductive material in the first negative electrode active material is preferably 0.001 mass % or more and 10 mass % or less, more preferably 0.01 mass % or more and 10 mass % or less, still more preferably 1 mass % or more and 10 mass % or less, and particularly preferably 5 mass % or more and 10 mass % or less.

When the content of the conductive material is 0.001 mass % or more, the conductivity of the covering portion 32, that is, the conductivity of the surface of the first negative electrode active material particle 30 is more effectively improved. Therefore, cycle characteristics are further improved. On the other hand, when the content of the conductive material is more than 10 mass %, the content of the central portion 31 (silicon-containing material) in the first negative electrode active material particle 30 decreases, and the energy density decreases.

The above-described content of the conductive material is determined as follows. First, the negative electrode active material is stirred in an appropriate dispersion medium (for example, N-methylpyrrolidone) to be dispersed the negative electrode active material in the dispersion medium. Subsequently, only the first negative electrode active material is taken out by centrifugal separation. Next, using a thermo-gravimetric-differential thermal analyzer (TG-DTA, for example, Rigaku Thermo plus TG8120 manufactured by Rigaku Corporation), several to several tens mg of a sample (the first negative electrode active material) is heated to 600° C. in an air atmosphere at a rate of temperature increase of 1 to 5° C./min, and by using the weight loss amount at that time, the content of the conductive material in the first negative electrode active material is determined.

Figure 2:
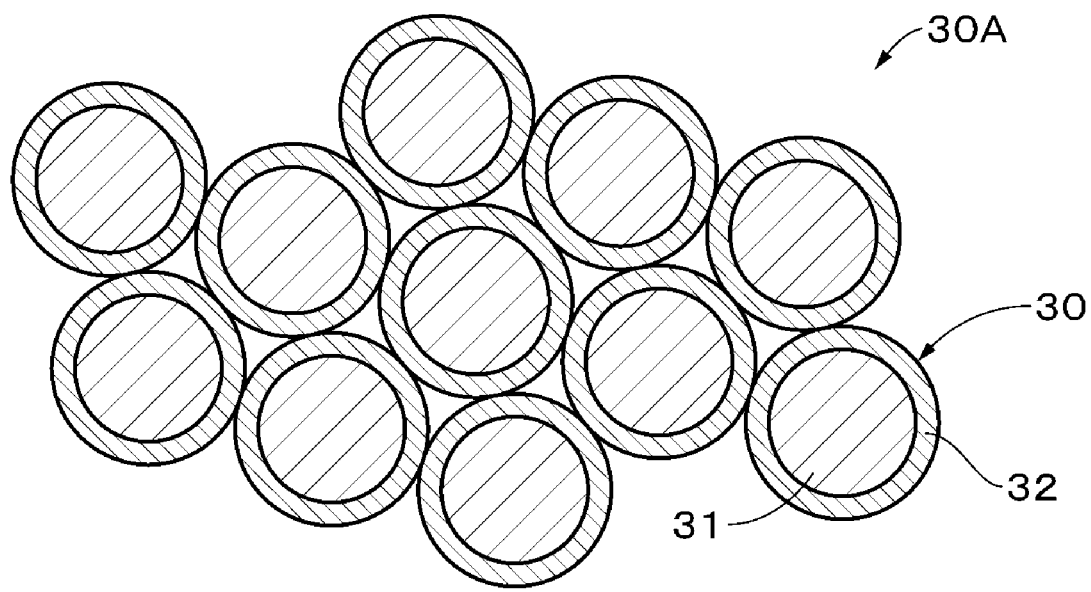
FIG. 2 is a sectional view schematically illustrating an example of a configuration of a composite particle formed of a plurality of first negative electrode active material particles according to an embodiment of the present disclosure.

When particle sizes of a plurality of the first negative electrode active material particles 30 (particle size of primary particles) is small, more specifically, when a plurality of the first negative electrode active material particles 30 include a particle having a particle size of 1 μm or less, it is preferred that a plurality of the first negative electrode active material particles 30 densely gather with each other to form an assembly (composite particle 30A) as illustrated in FIG. 2. That is, the first negative electrode active material preferably contains the composite particle 30A in which a plurality of the first negative electrode active material particles 30 are in close contact with each other. The number of the composite particles 30A contained in the first negative electrode active material is not particularly limited, and may be only one, or two or more. FIG. 2 illustrates one composite particle 30A. Whether or not a plurality of the first negative electrode active material particles 30 contain a particle having a particle size of 1 μm or less can be confirmed by measuring the particle size distribution of a plurality of the first negative electrode active material particles 30.

The composite particle 30A described herein is not merely aggregates of a plurality of the first negative electrode active material particles 30. The composite particle 30A is a structure in which a plurality of the first negative electrode active material particles 30 are firmly connected to each other with the covering portion 32 functioning as binder interposed therebetween.

When the composite particle 30A is formed of a plurality of the first negative electrode active material particles 30, the following advantages can be obtained. First, since the specific surface area decreases, the decomposition reaction of the electrolytic solution on the surfaces of the first negative electrode active material particle 30 is suppressed. Second, since the first negative electrode active material particles 30 are connected to each other, a conduction path of lithium ions is secured inside the composite particle 30A. Third, since a gap (diffusion path of lithium ions) is formed between the first negative electrode active material particles 30, a migration path of the lithium ions is secured. As a result, in the composite particle 30A, electric resistance is reduced, and entrance and exit of lithium ions are facilitated.

The number of the first negative electrode active material particles 30 forming one composite particle 30A is not particularly limited. For example, FIG. 2 illustrates a case where one composite particle 30A is formed of 11 first negative electrode active material particles 30 to simplify the illustration.

However, the first negative electrode active material may contain, together with the composite particle 30A, one, or two or more first negative electrode active material particles 30 that are not involved in the formation of the composite particle 30A, that is, free first negative electrode active material particles 30. In other words, not all the first negative electrode active material particles 30 need to form the composite particle 30A, and the first negative electrode active material particle 30 not forming the composite particle 30A may be present.

The composite particle 30A can be easily formed, for example, when a specific method is used as a method for forming a plurality of the first negative electrode active material particles 30. This specific method is, for example, a spray drying method. Details of the method for forming the composite particle 30A will be described later.

Each of the second negative electrode active material particles 40 contains a carbon-containing material, and the carbon-containing material collectively refers to materials containing carbon as a constituent element. However, the carbon-containing material may contain only carbon as a constituent element. It should be understood that the number of types of the carbon-containing material may be only one, or two or more.

By the second negative electrode active material particles 40 containing the carbon-containing material, the crystal structure of the carbon-containing material hardly changes at the time of occlusion and release of lithium, and the carbon-containing material also functions as a conductive agent. Accordingly, a high energy density can be stably obtained, and the conductivity of the negative electrode active material layer is improved.

Specifically, examples of the carbon-containing material include graphitizable carbon, non-graphitizable carbon, and graphite. It should be understood that the spacing of the (002) plane in the non-graphitizable carbon is, for example, 0.37 nm or more, and the spacing of the (002) plane in the graphite is, for example, 0.34 nm or less.

More specifically, examples of the carbon-containing material include pyrolytic carbons, cokes, glassy carbon fibers, organic polymer compound fired bodies, activated carbon, and carbon blacks. Examples of the cokes include pitch coke, needle coke, and petroleum coke. The organic polymer compound fired body is a fired product obtained by firing (carbonizing) a polymer compound such as phenol resin and furan resin at a discretionary temperature. Other than those, the carbon-containing material may be, for example, low crystalline carbon or amorphous carbon, both of which are heat-treated at a temperature of approximately 1000° C. or lower.

Examples of the shape of the second negative electrode active material particle 40 include, but are not particularly limited to, fibrous, spherical (particulate), and scaly shape. FIG. 1 illustrates, for example, a case where the shape of the second negative electrode active material particle 40 is a spherical shape. As a matter of course, a plurality of second negative electrode active material particles 40 having two or more types of shape may be mixed.

The negative electrode active material may further contain, together with the above-described two types of the negative electrode active materials (a plurality of the first negative electrode active material particles 30 and a plurality of the second negative electrode active material particles 40), for example, any one type of, or two or more types of other negative electrode active materials.

The other negative electrode active material is, for example, a metal-based material. The metal-based material collectively refers to materials containing any one type of, or two or more types of metal elements and metalloid elements as constituent elements. By the other negative electrode active material containing a metal material, high energy density can be obtained.

The metal-based material may be a single substance, an alloy, a compound, a mixture of two or more of these, or a material containing one, or two or more phases thereof. It should be understood that the alloy includes not only a material containing two or more types of metal elements but also a material constituted by one, or two or more types of metal elements and one, or two or more types of metalloid elements. Further, the alloy may contain one, or two or more types of nonmetallic elements. Examples of the structure of the metal-based material include a solid solution, a eutectic (eutectic mixture), an intermetallic compound, and a coexistence of two or more of these.

Each of the metal element and the metalloid element can form alloy with lithium. Specifically, examples of the metal element and the metalloid element include magnesium, boron, aluminum, gallium, indium, silicon, germanium, tin, lead, bismuth, cadmium, silver, zinc, hafnium, zirconium, yttrium, palladium, and platinum.

Among them, preferred are silicon and tin, and more preferred is silicon. As described above, since silicon has the excellent ability to occlude and release lithium, a remarkably high energy density can be obtained.

Specifically, the metal-based material may be a single substance of silicon, an alloy of silicon, a compound of silicon, a single substance of tin, an alloy of tin, a compound of tin, a mixture of two or more of these, or a material containing one, or two or more phases thereof. The meaning of the single substance described herein is as described above.

Details regarding each of the alloy of silicon and the compound of silicon are as described above. The alloy of tin contains, as constituent elements other than tin, for example, any one of, or two or more of silicon, nickel, copper, iron, cobalt, manganese, zinc, indium, silver, titanium, germanium, bismuth, antimony, chromium, and the like. The compound of tin contains, as constituent elements other than tin, for example, any one of, or two or more of carbon, oxygen, and the like. The compound of tin may contain, as constituent elements other than tin, for example, any one of, or two or more of a series of constituent elements described for the alloy of tin. Specifically, examples of the alloy of tin and the compound of tin include $SnO_w$ ($0<w\leq2$), $SnSiO_3$, and $Mg_2Sn$.

The first negative electrode active material is manufactured, for example, by a procedure described below.

First, a plurality of the central portions 31 each containing a silicon-containing material, the first compound, a precursor of the second compound, an aqueous solvent, and the like are mixed, and then the mixture is stirred. Conditions such as a stirring method and a stirring condition are not particularly limited. This can disperse a plurality of the central portions 31 in the aqueous solvent, and such aqueous solvent dissolves each of the first compound and the precursor of the second compound. Accordingly, an aqueous dispersion containing a plurality of the central portions 31, the first compound, and the precursor of the second compound is prepared.

Examples of the type of the aqueous solvent include, but are not particularly limited to, pure water. As the first compound, for example, a non-dissolved material may be used, or a dissolved material may be used. The dissolved material is, for example, a solution in which the first compound is dissolved with pure water or the like, and is a so-called aqueous solution of the first compound. As described above, either the non-dissolved material or the dissolved material may be used, which is similarly applicable to the precursor of the second compound.

The precursor of the second compound is, for example, $nSiO_2.M_2O$. The value of n is not particularly limited, but is preferably in a range in which $nSiO_2.M_2O$ exhibits water solubility, and for example, n is in a range of 0.5 or more and 7.5 or less. M1 is, for example, an alkali metal ion. Examples of the alkali metal include lithium, sodium, potassium. Specifically, the precursor of the second compound is $nSiO_2 \cdot Li_2O$, $nSiO_2 \cdot Na_2O$, $nSiO_2 \cdot K_2O$, or the like.

It should be understood that, when a conductive material is used, the same procedure is performed except that the conductive material is added to the above-described mixture. This can disperse the conductive material in the aqueous solvent, thus, an aqueous dispersion containing the conductive material is prepared together with a plurality of the central portions 31, the first compound, and the precursor of the second compound.

Subsequently, the aqueous dispersion is sprayed using a spray drying device, and then the sprayed liquid is dried. Conditions such as a drying method and a drying temperature are not particularly limited. In this way, the covering portion 32 containing the first compound and the second compound is formed on the surface of the central portion 31, whereby a plurality of the first negative electrode active material particles 30 can be obtained. It should be understood that that the second compound is produced mainly in the step of drying the sprayed liquid.

In this case, by using the spray drying method, while a plurality of the first negative electrode active material particles 30 are formed, a plurality of the first negative electrode active material particles 30 are brought into close contact with each other, whereby the composite particle 30A is formed.

As described above, in the negative electrode active material according to the first embodiment, the covering portion 32 contains the first compound ((meth)acrylic acid-based polymer) and the second compound (siloxane compound). By the covering portion 32 containing the first compound, the active site of the central portion 31 with the electrolytic solution is reduced, and reductive decomposition of the electrolytic solution is suppressed. Therefore, cycle characteristics are improved. In addition, by the covering portion 32 containing the second compound, ionic conductivity is imparted to the covering portion 32. Therefore, charge and discharge efficiency (for example, initial charge and discharge efficiency) is improved. It should be understood that that, when the covering portion 32 contains only the second compound, the effect of improving cycle characteristics is hardly exhibited. On the other hand, by the covering portion 32 containing the second compound together with the first compound, cycle characteristics are improved as compared with the case in which the covering portion 32 contains only the first compound.

In a second embodiment, a battery including a negative electrode containing the negative electrode active material according to the first embodiment will be described.

Figure 3:
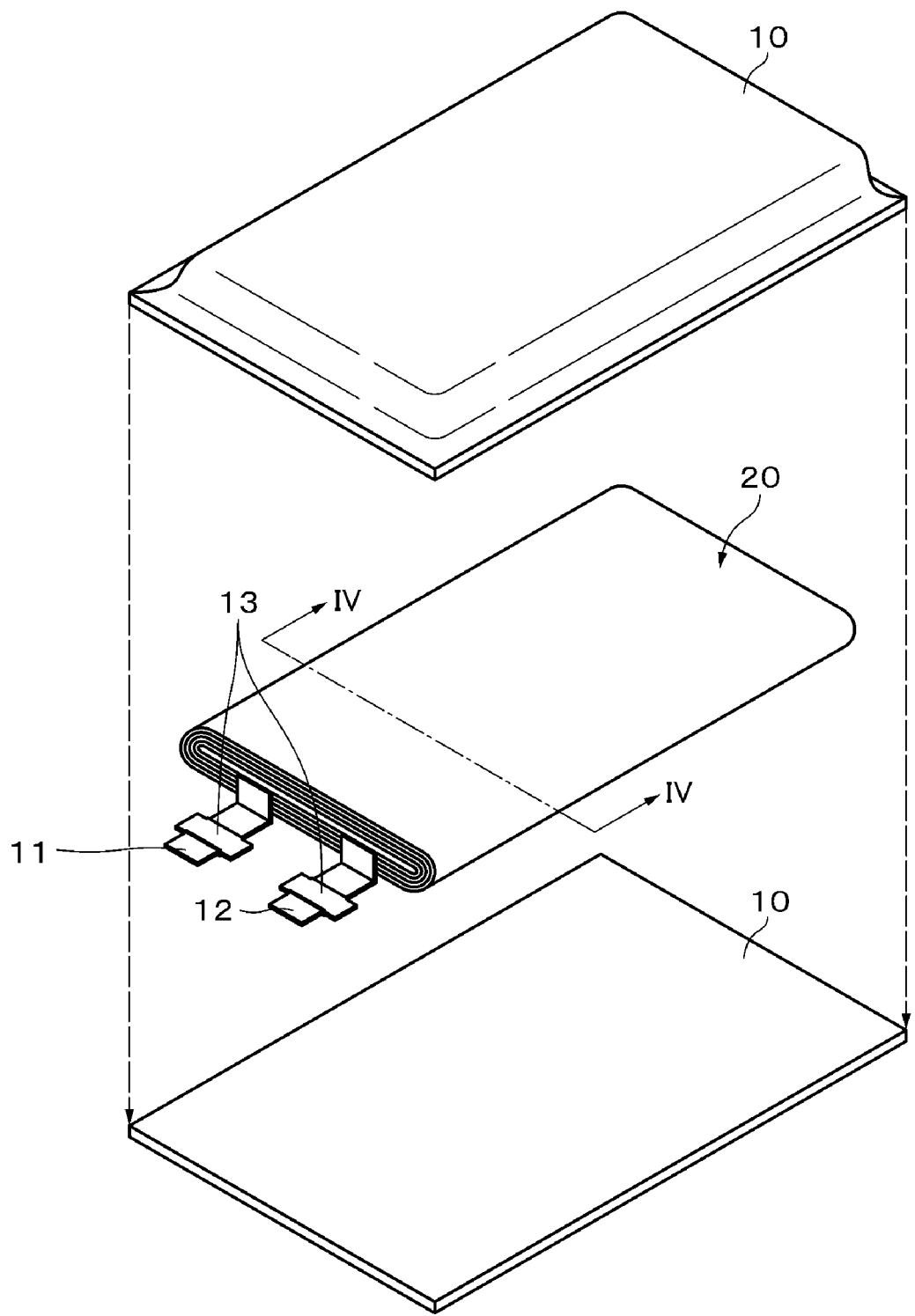
FIG. 3 is an exploded perspective view illustrating an example of a configuration of a nonaqueous electrolyte secondary battery according to an embodiment of the present disclosure.

First, an example of a configuration of a nonaqueous electrolyte secondary battery (hereinafter, simply referred to as a "battery") according to a second embodiment of the present disclosure will be described with reference to FIGS. 3 and 4. The battery is a so-called laminated type battery, and as illustrated in FIG. 3, includes a wound electrode body 20 to which a positive electrode lead 11 and a negative electrode lead 12 are attached, an electrolytic solution (not illustrated) as an electrolyte, and an exterior member 10 that has a film-like shape and accommodates the electrode body 20 and the electrolytic solution, and can be reduced in size, weight, and thickness.

The positive electrode lead 11 and the negative electrode lead 12 are each led out from the inside of the exterior member 10 toward the outside, for example, in the same direction. The positive electrode lead 11 and the negative electrode lead 12 are each formed of, for example, a metal material such as Al, Cu, Ni, or stainless steel, and each have a thin-plate or net-like shape.

The exterior member 10 is configured with, for example, a rectangular aluminum laminated film obtained by bonding nylon film, aluminum foil, and polyethylene film in this order. For example, the exterior member 10 is provided such that the polyethylene film side and the electrode body 20 face each other, and outer edge portions of the exterior members 10 are adhered to each other by fusion bonding or by using an adhesive. An adhesive film 13 for suppressing entry of outside air is inserted between the exterior member 10 and each of the positive electrode lead 11 and the negative electrode lead 12. The adhesive film 13 is formed of a material having adhesion to the positive electrode lead 11 and the negative electrode lead 12, for example, polyolefin resin such as polyethylene, polypropylene, modified polyethylene, or modified polypropylene.

It should be understood that the exterior member 10 may be configured with laminated film having another structure, polymer film such as polypropylene, or metal film instead of the aluminum laminated film described above. Alternatively, it may be configured with laminated film in which a polymer film is laminated on one surface or both surfaces of an aluminum film as a core material.

Figure 4:
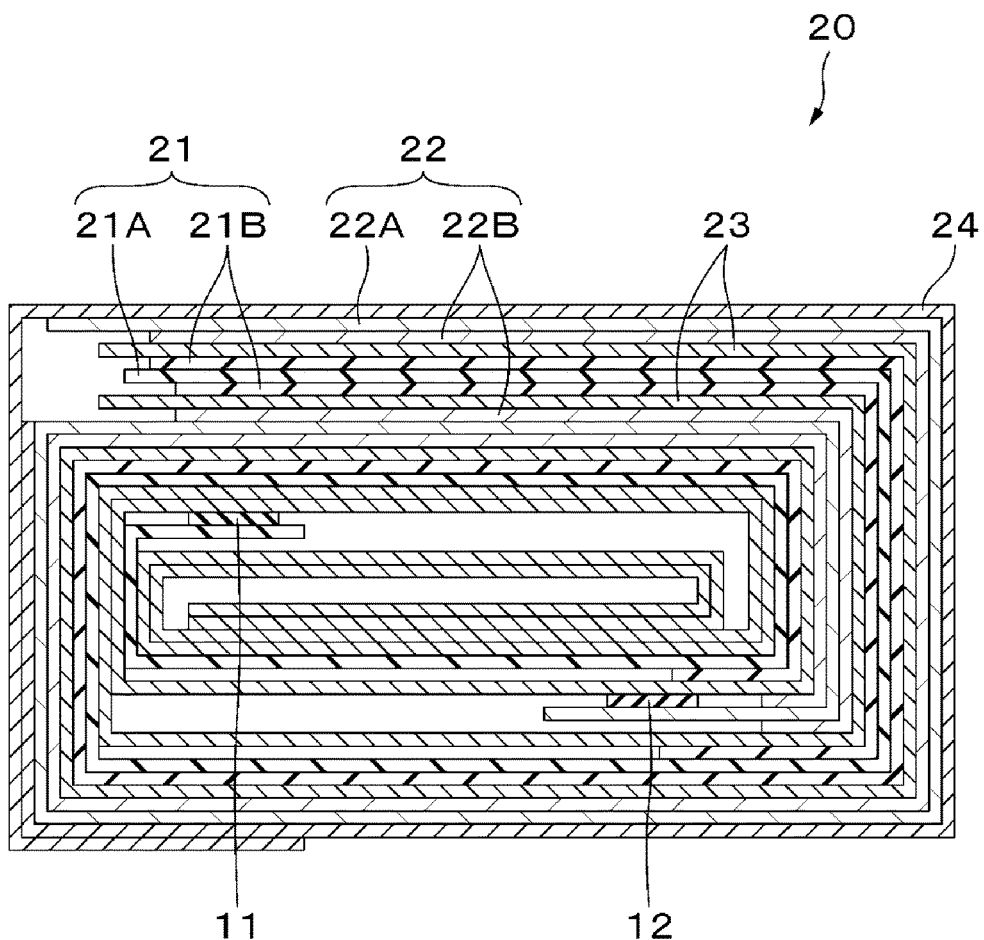
FIG. 4 is a sectional view taken along line IV-IV of FIG. 3.

As illustrated in FIG. 4, the electrode body 20 includes a positive electrode 21 having an elongated shape, a negative electrode 22 having an elongated shape, and a separator 23 provided between the positive electrode 21 and the negative electrode 22 and having an elongated shape. The electrode body 20 has a configuration in which the positive electrode 21 and the negative electrode 22 are laminated with the separator 23 interposed therebetween and wound in a longitudinal direction so as to have a flattened and swirling shape, and an outermost peripheral portion of the electrode body 20 is protected by a protection tape 24. The positive electrode 21, the negative electrode 22, and the separator 23 are impregnated with an electrolytic solution.

Hereinafter, the positive electrode 21, the negative electrode 22, the separator 23, and the electrolytic solution constituting the battery will be sequentially described.

The positive electrode 21 includes, for example, a positive electrode current collector 21A and a positive electrode active material layer 21B provided on each side of the positive electrode current collector 21A. The positive electrode current collector 21A is configured with, for example, metal foil such as aluminum foil, nickel foil, or stainless-steel foil. The positive electrode active material layer 21B contains one type of, or two or more types of positive electrode active materials capable of occluding and releasing lithium. The positive electrode active material layer 21B may further contain at least one of binder and the conductive agent as necessary.

As the positive electrode active material, for example, a lithium-containing compound such as a lithium oxide, a lithium phosphorus oxide, a lithium sulfide, or an intercalation compound containing lithium is suitable, and two or more of these may be mixed and used. To increase the energy density, preferred is a lithium-containing compound containing lithium, a transition metal element, and oxygen. Examples of such a lithium-containing compound include a lithium composite oxide represented by Formula (A) and having a layered rock salt structure; and a lithium composite phosphate represented by Formula (B) and having an olivine-type structure. The lithium-containing compound more preferably contains, as a transition metal element, at least one selected from the group consisting of Co, Ni, Mn, and Fe. Examples of such a lithium-containing compound include a lithium composite oxide represented by Formula (C), (D), or (E) and having a layered rock salt structure; a lithium composite oxide represented by Formula (F) and having a spinel-type structure; and a lithium composite phosphate represented by Formula (G) and having an olivine-type structure. Specific examples thereof include $LiNi_{0.50}Co_{0.20}Mn_{0.30}O_2$, $LiCoO_2$, $LiNiO_2$, $LiNi_aCo_{1-a}O_2$ (0<a<1), $LiMn_2O_4$, and $LiFePO_4$.

$$Li_pNi_{(1-q-r)}Mn_qM1_rO_{(2-y)}X_z \qquad (A)$$

(In Formula (A), M1 represents at least one of elements selected from Groups 2 to 15 excluding Ni and Mn. X represents at least one selected from the group consisting of Group 16 elements except for oxygen and Group 17 elements. p, q, y, and z are values within the ranges of 0≤p≤1.5, 0≤q≤1.0, 0≤r≤1.0, −0.10≤y≤0.20, and 0≤z≤0.2.)

$$Li_aM2_bPO_4 \qquad (B)$$

(In Formula (B), M2 represents at least one of elements selected from Groups 2 to 15. a and b are values within the ranges of 0≤a≤2.0 and 0.5≤b≤2.0.)

$$Li_fMn_{(1-g-h)}Ni_gM3_hO_{(2-j)}F_k \qquad (C)$$

(In Formula (C), M3 represents at least one selected from the group consisting of Co, Mg, Al, B, Ti, V, Cr, Fe, Cu, Zn, Zr, Mo, Sn, Ca, Sr, and W. f, g, h, j, and k are values within the ranges of 0.8≤f≤1.2, 0<g<0.5, 0≤h≤0.5, g+h<1, −0.1≤j≤0.2, and 0≤k≤0.1. It should be understood that the composition of lithium varies depending on the state of charge and discharge, and the value of f represents a value in a fully discharged state.)

$$Li_mNi_{(1-n)}M4_nO_{(2-p)}F_q \quad (D)$$

(In Formula (D), M4 represents at least one selected from the group consisting of Co, Mn, Mg, Al, B, Ti, V, Cr, Fe, Cu, Zn, Mo, Sn, Ca, Sr, and W. m, n, p, and q are values within the ranges of 0.8≤m≤1.2, 0.005≤n≤0.5, −0.1≤p≤0.2, and 0≤q≤0.1. It should be understood that the composition of lithium varies depending on the state of charge and discharge, and the value of m represents a value in a fully discharged state.)

$$Li_rCo_{(1-s)}M5_sO_{(2-t)}F_u \quad (E)$$

(In Formula (E), M5 represents at least one selected from the group consisting of Ni, Mn, Mg, Al, B, Ti, V, Cr, Fe, Cu, Zn, Mo, Sn, Ca, Sr, and W. r, s, t, and u are values within the ranges of 0.8≤r≤1.2, 0≤s<0.5, −0.1≤t≤0.2, and 0≤u≤0.1. It should be understood that the composition of lithium varies depending on the state of charge and discharge, and the value of r represents a value in a fully discharged state.)

$$Li_vMn_{2-w}M6_wO_xF_y \quad (F)$$

(In Formula (F), M6 represents at least one selected from the group consisting of Co, Ni, Mg, Al, B, Ti, V, Cr, Fe, Cu, Zn, Mo, Sn, Ca, Sr, and W. v, w, x, and y are values within the ranges of 0.9≤v≤1.1, 0≤w≤0.6, 3.7≤x≤4.1, and 0≤y≤0.1. It should be understood that the composition of lithium varies depending on the state of charge and discharge, and the value of v represents a value in a fully discharged state.)

$$Li_zM7PO_4 \quad (G)$$

(In Formula (G), M7 represents at least one selected from the group consisting of Co, Mg, Fe, Ni, Mg, Al, B, Ti, V, Nb, Cu, Zn, Mo, Ca, Sr, W, and Zr. z is a value within a range of 0.9≤z≤1.1. It should be understood that the composition of lithium varies depending on the state of charge and discharge, and the value of z represents a value in a fully discharged state.)

As the positive electrode active material capable of occluding and releasing lithium, inorganic compounds containing no lithium, such as $MnO_2$, $V_2O_5$, $V_6O_{13}$, NiS, and MoS, can also be used, in addition to these.

The positive electrode active material capable of occluding and releasing lithium may be other than those described above. Further, two or more types of the positive electrode active materials exemplified above may be mixed in any combination.

As the binder, for example, at least one selected from the group consisting of polyvinylidene difluoride, polytetrafluoroethylene, polyacrylonitrile, styrene butadiene rubber, carboxymethyl cellulose, copolymers containing one of these resin materials as a main component, and the like can be used.

As the conductive agent, for example, at least one carbon material selected from the group consisting of graphite, carbon fibers, carbon black, acetylene black, Ketjen black, carbon nanotubes, graphene, and the like can be used. The conductive agent may be any material having conductivity, and is not limited to a carbon material. For example, a metal material, a conductive polymer material, or the like may be used as the conductive agent. Examples of the shape of the conductive agent include a granular shape, a scaly shape, a hollow shape, a needle shape, and a cylindrical shape, but are not particularly limited thereto.

The negative electrode 22 includes, for example, a negative electrode current collector 22A and a negative electrode active material layer 22B provided on each side of the negative electrode current collector 22A. The negative electrode current collector 22A is configured with, for example, metal foil such as copper foil, nickel foil, or stainless-steel foil. The negative electrode active material layer 22B contains a negative electrode active material capable of occluding and releasing lithium. The negative electrode active material layer 22B may further contain at least one of the binder and the conductive agent as necessary.

Incidentally, it is preferred in this battery that the electrochemical equivalent of the negative electrode 22 or the negative electrode active material is greater than the electrochemical equivalent of the positive electrode 21, and theoretically, lithium metal is not deposited on the negative electrode 22 during charge.

The negative electrode active material is the negative electrode active material according to the first embodiment. When the content of a first compound, a second compound, or a conductive material in a first negative electrode active material is measured, the battery is disassembled to take out the negative electrode active material, and then the content of the first compound, the second compound, or the conductive material is determined as described in the first embodiment. The negative electrode active material is taken out from the battery as follows, for example. First, the negative electrode 22 is taken out from the battery, washed with dimethyl carbonate (DMC), and dried. Then the negative electrode current collector 22A is removed, thereafter the remaining portion was heated and stirred in an appropriate dispersion medium (for example, N-methylpyrrolidone) to disperse the negative electrode active material, the binder, the conductive assistant, and the like in the dispersion medium. Subsequently, only the negative electrode active material is taken out by centrifugal separation.

As the binder, the same material as that of the positive electrode active material layer 21B can be used.

As the conductive agent, the same material as that of the positive electrode active material layer 21B can be used.

The separator 23 separates the positive electrode 21 and the negative electrode 22, and allows lithium ions to pass therethrough while preventing a short circuit of current due to contact between both electrodes. The separator 23 is configured with, for example, a porous film containing: polytetrafluoroethylene; a polyolefin resin (polypropylene (PP), polyethylene (PE), or the like); an acrylic resin; a styrene resin; a polyester resin; a nylon resin; or a resin obtained by blending these resins, and may have a structure in which two or more of these porous films are laminated.

Among them, preferred is a porous film formed of polyolefin because it has an excellent short circuit-prevention effect and can improve the safety of the battery by a shutdown effect. Particularly preferred is polyethylene as a material constituting the separator 23 because polyethylene can provide a shutdown effect within a range of 100° C. or more and 160° C. or less and is also excellent in electrochemical stability. Among them, low-density polyethylene, high-density polyethylene, and linear polyethylene are suitably used because they have an appropriate fusing temperature and are easily available. In addition, a material obtained by copolymerizing or blending a resin having chemical stability with polyethylene or polypropylene can be used. Alternatively, the porous film may have a structure of three or more layers in which a polypropylene layer, a polyethylene layer, and a polypropylene layer are sequentially laminated. For example, the porous film desirably has a three-layer structure of PP/PE/PP, and the mass ratio [wt %] between PP and PE desirably satisfies PP:PE=60:40 to 75:25. Alternatively, from the viewpoint of costs, the porous film can be formed of the single-layer substrate having 100 wt % of PP or 100 wt % of PE. For the method of producing the separator 23, either of a wet production method or a dry production method may be employed.

As the separator 23, nonwoven fabric may be used. As the fibers constituting the nonwoven fabric, aramid fibers, glass fibers, polyolefin fibers, polyethylene terephthalate (PET) fibers, nylon fibers, or the like can be used. Alternatively, two or more of these fibers may be mixed to form the nonwoven fabric.

The separator 23 may have a configuration including a substrate and a surface layer provided on one or both surfaces of the substrate. The surface layer includes inorganic particles having electrical insulation properties and a resin material that binds the inorganic particles to the surface of the substrate and binds the inorganic particles to each other. This resin material may, for example, be fibrillated and have a three-dimensional network structure in which a plurality of fibrils are connected to each other. The inorganic particles are supported on the resin material having the three-dimensional network structure. Alternatively, without being fibrillated, the resin material may bind the inorganic particles to the surface of the substrate, and bind the inorganic particles to each other. In this case, higher binding properties can be obtained. By providing the surface layer on one or both surfaces of the substrate as described above, the oxidation resistance, the heat resistance, and the mechanical strength of the separator 23 can be improved.

The substrate is a porous film configured with an insulating film that allows lithium ions to pass therethrough and has a predetermined mechanical strength, and the electrolytic solution is held in the pores of the substrate. Accordingly, the substrate preferably has characteristics of high resistance to the electrolytic solution, low reactivity, and difficulty in expansion.

As a material constituting the substrate, a resin material or a nonwoven fabric constituting the above-described separator 23 can be used.

The inorganic particle contains at least one selected from the group consisting of metal oxide, metal nitride, metal carbide, metal sulfide, and the like. As the metal oxide, aluminum oxide (alumina, $Al_2O_3$), boehmite (hydrated aluminum oxide), magnesium oxide (magnesia, MgO), titanium oxide (titania, $TiO_2$), zirconium oxide (zirconia, $ZrO_2$), silicon oxide (silica, $SiO_2$), yttrium oxide (yttria, $Y_2O_3$), or the like can be suitably used. As the metal nitride, silicon nitride ($Si_3N_4$), aluminum nitride (AlN), boron nitride (BN), titanium nitride (TiN), or the like can be suitably used. As the metal carbide, silicon carbide (SiC), boron carbide ($B_4C$), or the like can be suitably used. As the metal sulfide, barium sulfate ($BaSO_4$) or the like can be suitably used. Among the metal oxide described above, alumina, titania (particularly having a rutile-type structure), silica, or magnesia is preferably used, and alumina is more preferably used.

Further, the inorganic particle may contain a mineral such as porous aluminosilicate such as zeolite ($M_{2/n}$O·$Al_2O_3$·$xSiO_2$·$yH_2O$, M represents a metal element, x≥2, y≥0); layered silicate; barium titanate ($BaTiO_3$); or strontium titanate ($SrTiO_3$). The inorganic particle has oxidation resistance and heat resistance, and the surface layer containing the inorganic particles opposite the positive electrode has strong resistance to an oxidizing environment near the positive electrode during charge. The shape of the inorganic particle is not particularly limited, and any of spherical shape, plate-like shape, fibrous shape, cubic shape, random shape, and the like can be used.

The particle size of the inorganic particle is preferably in a range of 1 nm or more and 10 μm or less. This is because when the particle size is smaller than 1 nm, it is difficult to obtain the inorganic particles, whereas when the particle size is larger than 10 μm, the distance between the electrodes increases, and the active-material filling amount cannot be sufficiently obtained in a limited space, which causes the decrease of battery capacity.

Examples of the resin material constituting the surface layer include fluorine-containing resins such as polyvinylidene difluoride and polytetrafluoroethylene; fluorine-containing rubber such as a vinylidene difluoride-tetrafluoroethylene copolymer and an ethylene-tetrafluoroethylene copolymer; rubbers such as a styrene-butadiene copolymer or a hydrogenated product thereof, an acrylonitrile-butadiene copolymer or a hydrogenated product thereof, an acrylonitrile-butadiene-styrene copolymer or a hydrogenated product thereof, a methacrylic acid ester-acrylic acid ester copolymer, a styrene-acrylic acid ester copolymer, an acrylonitrile-acrylic acid ester copolymer, ethylene propylene rubber, polyvinyl alcohol, and polyvinyl acetate; cellulose derivatives such as ethyl cellulose, methyl cellulose, hydroxyethyl cellulose, and carboxymethyl cellulose; and resins having at least one of a melting point or a glass transition temperature of 180° C. or higher to have high heat resistance, such as polyphenylene ether, polysulfone, polyethersulfone, polyphenylene sulfide, polyether imide, polyimide, a polyamide, e.g., a wholly aromatic polyamide (aramid), polyamide imide, polyacrylonitrile, polyvinyl alcohol, polyether, an acrylic acid resin, and polyester. These resin materials may be used singly, or in combination of two or more of these. Among them, preferred are fluorine-based resins such as polyvinylidene difluoride from the viewpoints of oxidation resistance and flexibility, and the surface layer preferably contains aramid or polyamide imide from the viewpoint of the heat resistance.

As a method for forming the surface layer, for example, a method can be used in which a slurry containing a matrix resin, a solvent, and inorganic particles is applied onto a substrate (porous film), the substrate is passed through a bath containing a solvent, which is a poor solvent for the matrix resin as well as a good solvent for the above solvent to cause phase separation, and then the substrate is dried.

The inorganic particles described above may be contained in a porous film as the substrate. Alternatively, the surface layer may not contain any inorganic particles and may be formed of only the resin material.

The electrolytic solution is a so-called nonaqueous electrolytic solution, and contains an organic solvent (nonaqueous solvent) and an electrolyte salt dissolved in the organic solvent. The electrolytic solution may contain a publicly known additive to improve battery characteristics. It should be understood that an electrolyte layer containing an electrolytic solution and a polymer compound serving as a holding material for holding the electrolytic solution may be used instead of the electrolytic solution. In this case, the electrolyte layer may be in a gel state.

As the organic solvent, cyclic carbonic acid esters such as ethylene carbonate and propylene carbonate can be used, and it is preferred to use one of ethylene carbonate and propylene carbonate, and particularly preferred to use both in mixture. This is because cycle characteristics can be further improved.

As the organic solvent, it is preferred to mix a chain carbonic acid ester such as diethyl carbonate, dimethyl carbonate, ethyl methyl carbonate, or methyl propyl carbonate, to these cyclic carbonate esters and use such mixture. This is because high ion conductivity can be obtained.

The organic solvent preferably further contains 2,4-difluoroanisole or vinylene carbonate. This is because 2,4-difluoroanisole can further improve discharge capacity, and vinylene carbonate can further improve cycle characteristics. Therefore, it is preferred to use a mixture thereof because the mixture can further improve discharge capacity and cycle characteristics.

In addition to these, examples of the organic solvent include butylene carbonate, γ-butyrolactone, γ-valerolactone, 1,2-dimethoxyethane, tetrahydrofuran, 2-methyltetrahydrofuran, 1,3-dioxolane, 4-methyl-1,3-dioxolane, methyl acetate, methyl propionate, acetonitrile, glutaronitrile, adiponitrile, methoxyacetonitrile, 3-methoxypropylnitrile, N,N-dimethylformamide, N-methylpyrrolidinone, N-methyloxazolidinone, N,N-dimethylimidazolidinone, nitromethane, nitroethane, sulfolane, dimethyl sulfoxide, trimethyl phosphate.

It should be understood that that a compound obtained by substituting at least part of hydrogen in these organic solvents with fluorine may be preferred because the reversibility of electrode reaction may be improved in some cases, depending on the type of electrode to be combined.

Examples of the electrolyte salt include lithium salts, and one lithium salt may be used singly, or two or more lithium salts may be used in mixture. Examples of the lithium salt include $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, $LiCl$, difluoro[oxolato-O,O'] lithium borate, lithium bis(oxalate)borate, and LiBr. Among them, preferred is $LiPF_6$ because high ion conductivity can be obtained and cycle characteristics can be further improved.

The positive electrode potential (vs $Li/Li^+$) in a fully charged state is preferably more than 4.20 V, more preferably 4.25 V or more, still more preferably more than 4.40 V, particularly preferably 4.45 V or more, and most preferably 4.50 V or more. However, the positive electrode potential (vs $Li/Li^+$) in the fully charged state may be 4.20 V or less. From the viewpoint of suppressing deterioration of battery characteristics, the upper limit value of the positive electrode potential (vs $Li/Li^+$) in the fully charged state is preferably 5.00 V or less, more preferably 4.80 V or less, and still more preferably 4.70 V or less.

When the battery having the above-described configuration is charged, lithium ions are released from the positive electrode active material layer 21B and occluded in the negative electrode active material layer 22B through the electrolytic solution, for example. When such battery is discharged, lithium ions are released from the negative electrode active material layer 22B and occluded in the positive electrode active material layer 21B through the electrolytic solution, for example.

Next, an example of a method for manufacturing the battery according to the second embodiment of the present disclosure will be described.

The positive electrode 21 is produced as follows. First, for example, a positive electrode mixture is prepared by mixing the positive electrode active material, the binder, and the conductive agent, then this positive electrode mixture is dispersed in a solvent such as N-methyl-2-pyrrolidone (NMP) to produce a paste-like positive electrode mixture slurry. Next, this positive electrode mixture slurry is applied to both surfaces of the positive electrode current collector 21A, then the solvent is dried, and such positive electrode current collector 21A is compression-molded by a roll pressing machine or the like to form the positive electrode active material layer 21B, thereby giving the positive electrode 21.

The negative electrode 22 is produced as follows. First, for example, a negative electrode active material and the binder are mixed to prepare a negative electrode mixture, then this negative electrode mixture is dispersed in a solvent such as N-methyl-2-pyrrolidone to produce a paste-like negative electrode mixture slurry. Next, this negative electrode mixture slurry is applied to both surfaces of the negative electrode current collector 22A, then the solvent is dried, and such negative electrode current collector 22A is compression-molded by a roll pressing machine or the like to form the negative electrode active material layer 22B, thereby giving the negative electrode 22.

The wound electrode body 20 is produced as follows. First, the positive electrode lead 11 is attached to one end portion of the positive electrode current collector 21A by welding, and the negative electrode lead 12 is attached to one end portion of the negative electrode current collector 22A by welding. Next, the positive electrode 21 and the negative electrode 22 are wound around a flattened core with the separator 23 interposed therebetween and wound many times in the longitudinal direction, and then the protection tape 24 is adhered to the outermost peripheral portion, thereby giving the electrode body 20.

The electrode body 20 is sealed with the exterior member 10 as follows. First, the electrode body 20 is sandwiched between the exterior members 10, then the outer peripheral edge portion excluding one side is thermally fusion-bonded to form a bag shape, so that the electrode body 20 is housed inside the exterior member 10. At that time, the adhesive film 13 is inserted between each of the positive electrode lead 11 and the negative electrode lead 12 and the exterior member 10. The adhesive film 13 may be attached beforehand to each of the positive electrode lead 11 and the negative electrode lead 12. Next, an electrolytic solution is injected into the exterior member 10 from one side having not been fusion-bonded, and then the side having not been fusion-bonded is thermally fusion-bonded in a vacuum atmosphere thereby hermetically sealed. As described above, the battery illustrated in FIG. 3 can be obtained.

As described above, the battery according to the second embodiment includes the positive electrode 21, the negative electrode 22, and the electrolytic solution. The negative electrode 22 contains the negative electrode active material according to the first embodiment. In this way, cycle characteristics, and charge and discharge efficiency (for example, initial charge and discharge efficiency) can be improved.

In a third embodiment, an electronic device including the above-described battery according to the second embodiment will be described.

Figure 5:
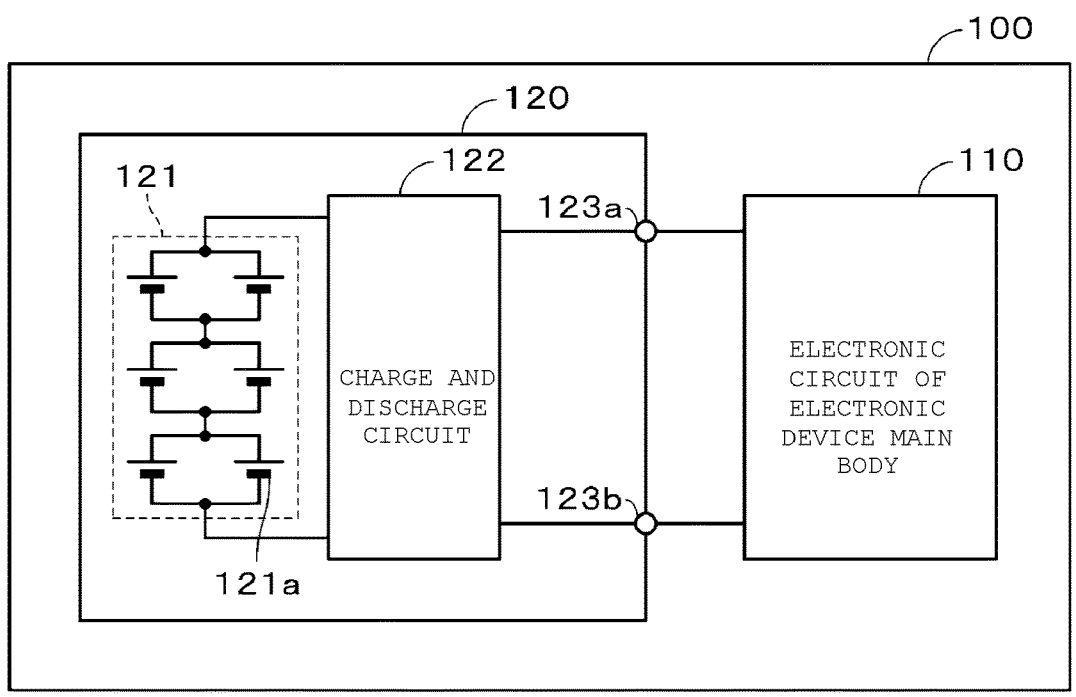
FIG. 5 is a block diagram illustrating an example of a configuration of an electronic device according to an embodiment of the present disclosure.

Hereinafter, an example of a configuration of an electronic device 100 according to a third embodiment of the present disclosure will be described with reference to FIG. 5. The electronic device 100 includes an electronic circuit 110 of an electronic device main body, and a battery pack 120. The battery pack 120 is electrically connected to the electronic circuit 110 via a positive electrode terminal 123a and a negative electrode terminal 123b. The electronic device 100 may have a configuration in which the battery pack 120 is freely attachable and detachable.

Examples of the electronic device 100 include, but are not limited to a notebook personal computer, a tablet computer, a mobile phone (for example, a smartphone), a handheld terminal (Personal Digital Assistants: PDA), a display device (a Liquid Crystal Display (LCD), an Electro Luminescence (EL) display, electronic paper, and the like), an imaging device (for example, a digital still camera and a digital video camera), an audio instrument (for example, a portable audio player), a game machine, a cordless phone handset, an electronic book, an electronic dictionary, a radio, a headphone, a navigation system, a memory card, a pacemaker, a hearing aid, an electric tool, an electric shaver, a refrigerator, an air conditioner, a television, a stereo, a water heater, a microwave oven, a dishwasher, a washing machine, a dryer, a lighting device, a toy, a medical device, a robot, a load conditioner, and a traffic light.

The electronic circuit 110 includes, for example, a central processing unit (CPU), a peripheral logic unit, an interface unit, a storage unit, and controls the overall electronic device 100.

The battery pack 120 includes an assembled battery 121 and a charge and discharge circuit 122. The battery pack 120 may further include an exterior member (not illustrated) that accommodates the assembled battery 121 and the charge and discharge circuit 122 as necessary.

The assembled battery 121 is configured by connecting a plurality of secondary batteries 121a in series and/or in parallel. A plurality of the secondary batteries 121a are connected to form, for example, an arrangement of n batteries in parallel and m batteries in series (n and m each represent a positive integer). Incidentally, FIG. 5 illustrates an example in which six secondary batteries 121a are connected to form an arrangement of two batteries in parallel and three batteries in series (2P3S). As the secondary battery 121a, the above-described battery according to the second embodiment is used.

Here, a case in which the battery pack 120 includes the assembled battery 121 including a plurality of the secondary batteries 121a will be described, but a configuration in which the battery pack 120 includes one secondary battery 121a instead of the assembled battery 121 may be employed.

The charge and discharge circuit 122 is a control unit that controls charge and discharge of the assembled battery 121. Specifically, the charge and discharge circuit 122 controls the charge with respect to the assembled battery 121 during the charge. On the other hand, the charge and discharge circuit 122 controls the discharge with respect to the electronic device 100 during the discharge (that is, during the use of the electronic device 100).

As the exterior member, for example, a case configured with metal, polymer resin, a composite material thereof, or the like can be used. Examples of the composite material include a laminate in which a metal layer and a polymer resin layer are laminated.

EXAMPLES

Hereinafter, Examples will specifically describe the present disclosure, but the present disclosure should not be limited only to these Examples.

Example 1

First, 98 mass % of a material of a central portion (Si powder), 1 mass % of a first compound (sodium polyacrylate (SPA)), and 1 mass % of a precursor of a second compound (lithium silicate ($3.5SiO_2 \cdot Li_2O$)) were mixed with an appropriate amount of pure water, then sufficiently stirred to give an aqueous dispersion. Subsequently, the aqueous dispersion was sprayed and dried using a spray drying device to give composite secondary particles.

By measuring an NMR spectrum of $^{29}Si$ in a covering portion, whether or not a siloxane compound (siloxane bond) was formed was confirmed.

Figure 7:
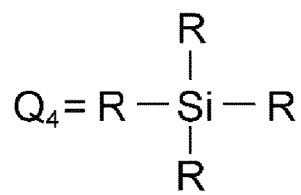
FIG. 7 is a diagram illustrating relationship between structures of $Q_0$ to $Q_4$ and peaks of an NMR spectrum of $^{29}$Si.
Figure 7:
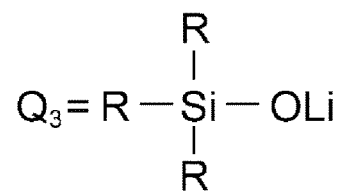
Figure 7:
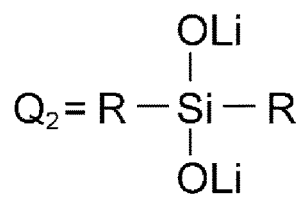
Figure 7:
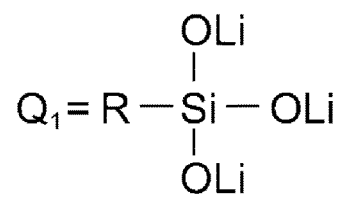
Figure 7:
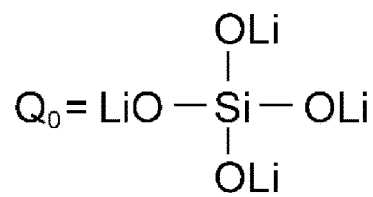

FIG. 6 illustrates an NMR spectrum of $^{29}Si$ in the covering portion. FIG. 7 illustrates relationship between the structures of $Q_0$ to $Q_4$ and peaks of the NMR spectrum of $^{29}Si$ (see J. Am. Chem. Soc., 1984, 106, 4396-4402.). It can be seen from FIGS. 6 and 7 that a siloxane compound is produced from the precursor of the second compound ($3.5SiO_2 \cdot Li_2O$) in the covering portion. It should be understood that the siloxane compound is produced mainly in the step of drying the above-described aqueous dispersion.

First, 10 mass % of a first negative electrode active material (composite secondary particles), 86 mass % of a second negative electrode active material (graphite (MCMB)), 3 mass % of negative electrode binder (PVdF), and 1 mass % of a negative electrode conductive agent (CNT) were mixed with an appropriate amount of a solvent (NMP), then kneaded and stirred by using a rotation and revolution mixer to give a negative electrode mixture slurry. Subsequently, this negative electrode mixture slurry was uniformly applied to both surfaces of a negative electrode current collector (copper foil having a thickness of 8 μm) having a belt-like shape. Next, the obtained coated product was dried with hot air and then compression-molded with a roll pressing machine to form a negative electrode sheet. Thereafter, the negative electrode sheet was cut into a belt-like shape of 72 mm×810 mm to produce a negative electrode. Finally, a negative electrode lead was attached to an exposed portion of the negative electrode current collector of the negative electrode.

First, 95 mass % of a positive electrode active material (lithium cobalt oxide), 2 mass % of a positive electrode conductive assistant (amorphous carbon powder (Ketjen black)), and 3 mass % of positive electrode binder (PVdF) were mixed to prepare a positive electrode mixture. Subsequently, this positive electrode mixture was dispersed in the solvent (NMP) to give a positive electrode mixture slurry. Next, this positive electrode mixture slurry was uniformly applied to both surfaces of a positive electrode current collector (aluminum foil having a thickness of 10 μm) having a belt-like shape. Then, the obtained coated product was dried with hot air and then compression-molded with a roll pressing machine to form a positive electrode sheet. Thereafter, this positive electrode sheet was cut into a belt-like shape of 70 mm×800 mm to produce a positive electrode. Finally, a positive electrode lead was attached to an exposed portion of the positive electrode current collector of the positive electrode.

First, ethylene carbonate (EC) and ethyl methyl carbonate (EMC) were mixed at a mass ratio satisfying EC:EMC=5:5 to give a mixed solvent. Next, lithium hexafluorophosphate (LiPF6) was dissolved as an electrolyte salt, in the obtained mixed solvent so as to have a concentration of 1 mol/l to give an electrolytic solution.

First, the produced positive electrode and negative electrode were brought into close contact with each other with a separator, configured with a microporous polyethylene film having a thickness of 25 μm, interposed therebetween, and wound in the longitudinal direction, and then a protection tape was attached to the outermost peripheral portion of these to produce a wound electrode body. Subsequently, this electrode body was loaded between exterior members, three sides of the exterior members were thermally fusion-bonded, and one side was not thermally fusion-bonded so that the exterior member have an opening. As the exterior member, moisture-proof aluminum laminated film in which nylon film having a thickness of 25 μm, aluminum foil having a thickness of 40 μm, and polypropylene film having a thickness of 30 μm were laminated in this order from the outermost layer was used. The electrolytic solution was injected from the opening of the exterior member, then the remaining one side of the exterior member was thermally fusion-bonded under reduced pressure and hermetically sealed to prepare a battery.

The battery was designed as follows. First, single-side coated samples of the positive electrode and the negative electrode were separately produced. Subsequently, a coin cell with a counter electrode Li of each of the produced electrodes was produced, and charge capacity was measured as follows. That is, in the case of the coin cell with a counter electrode Li of the positive electrode, constant current charge was performed at 0.1 C until the battery voltage reached an initial charge voltage of 4.45 V, and charge capacity was measured. In the case of the coin cell with a counter electrode Li of the negative electrode, after constant current charge was performed at 0.1 C until the battery voltage reached 0 V, constant voltage charge was performed until the current value reached 1/10 of the constant current value, and the charge capacity was measured. Next, charge capacity per combination thickness of each of the positive electrode and the negative electrode was determined. Using this value, the thicknesses of a positive electrode active material layer and a negative electrode active material layer were adjusted by the solid contents of the electrode slurries, the coating speed thereof, and the like so that the ratio of the charge capacity of the positive electrode to the charge capacity of the negative electrode ((charge capacity of the positive electrode)/(charge capacity of the negative electrode)) was 0.9.

Examples 2 to 4

As indicated in Table 1, a battery was obtained in the same manner as that of Example 1 except that the mixing amount of a material of the central portion (Si powder) and the first compound (sodium polyacrylate) was changed in the step of producing composite secondary particles.

Examples 5 to 7

As indicated in Table 1, a battery was obtained in the same manner as that of Example 1 except that the mixing amounts of a material of the central portion (Si powder) and the precursor of the second compound (lithium silicate $(3.5SiO \cdot Li_2O)$) were changed in the step of producing composite secondary particles.

Examples 8 and 9

As indicated in Table 1, a battery was obtained in the same manner as that of Example 1 except that potassium polyacrylate (KPA) and polyacrylamide (PAA) were used as the first compound instead of sodium polyacrylate (SPA) in the step of producing composite secondary particles.

Examples 10 and 11

As indicated in Table 1, a battery was obtained in the same manner as that of Example 1 except that $0.5SiO_2 \cdot Li_2O$ and $7.5SiO_2 \cdot Li_2O$ were used as precursors (lithium silicate) of the second compound instead of $3.5SiO_2 \cdot Li_2O$ in the step of producing composite secondary particles.

Examples 12 and 13

As indicated in Table 1, a battery was obtained in the same manner as that of Example 1 except that sodium silicate $(3.5SiO_2 \cdot Na_2O)$ and potassium silicate $(3.5SiO_2 \cdot K_2O)$ were used as precursors of the second compound instead of lithium silicate $(3.5SiO_2 \cdot Li_2O)$ in the step of producing composite secondary particles.

Examples 14 and 15

As indicated in Table 1, a battery was obtained in the same manner as that of Example 1 except that $SiTi_{0.01}$ powder and $SiO_x$ powder were used as materials of the central portion instead of the Si powder in the step of producing composite secondary particles.

Examples 16 to 20

As indicated in Table 1, a battery was obtained in the same manner as that of Example 1 except that a conductive material (MWCNT) was further added, and the added amount of a material of the central portion was changed in accordance with the added amount of the conductive material in the step of producing composite secondary particles.

Examples 21 to 23

As indicated in Table 1, a battery was obtained in the same manner as that of Example 16 except that SWCNT, CB, and scaly graphite were used as the conductive material instead of MWCNT, and the mixing amount of a material of the central portion and the conductive material was changed in the step of producing the composite secondary particles.

Examples 24 and 25

As indicated in Table 2, a battery was obtained in the same manner as that of Example 1 except that PI and AR were used as the negative electrode binder instead of PVDF in the step of producing the negative electrode.

Example 26

As indicated in Table 4, a battery was obtained in the same manner as that of Example 1 except that 20 mass % of the first negative electrode active material (composite secondary particles), 76 mass % of the second negative electrode active material (graphite (MCMB)), 3 mass % of the negative electrode binder (PVdF), and 1 mass % of the negative electrode conductive agent (CNT) were mixed with an appropriate amount of the solvent (NMP) in the step of producing the negative electrode.

Example 27

As indicated in Table 6, a battery was obtained in the same manner as that of Example 1 except that 30 mass % of the first negative electrode active material (composite secondary particles), 66 mass % of the second negative electrode active material (graphite (MCMB)), 3 mass % of the negative electrode binder (PVdF), and 1 mass % of the negative electrode conductive agent (CNT) were mixed with an appropriate amount of the solvent (NMP) in the step of producing the negative electrode.

Example 28

As indicated in Table 8, a battery was obtained in the same manner as that of Example 1 except that the second negative electrode active material was not added and the mixing amount of the first negative electrode active material and the negative electrode binder was changed in the step of producing the negative electrode.

Comparative Example 1

As indicated in Table 1, a battery was obtained in the same manner as that of Example 1 except that a material of the central portion (Si powder) was used as the first negative electrode active material in the step of producing the negative electrode.

Comparative Example 2

As indicated in Table 1, a battery was obtained in the same manner as that of Example 1 except that a precursor of the second compound was not added and the mixing amount of the first compound was changed in the step of producing the composite secondary particles.

Comparative Example 3

As indicated in Table 1, a battery was obtained in the same manner as that of Example 1 except that the first compound was not added and the mixing amount of a precursor of the second compound was changed in the step of producing the composite secondary particles.

Comparative Example 4

As indicated in Table 3, a battery was obtained in the same manner as that of Example 26 except that a material of the central portion (Si powder) was used as the first negative electrode active material in the step of producing the negative electrode.

Comparative Example 5

As indicated in Table 5, a battery was obtained in the same manner as that of Example 27 except that a material of the central portion (Si powder) was used as the first negative electrode active material in the step of producing the negative electrode.

Comparative Example 6

As indicated in Table 7, a battery was obtained in the same manner as that of Example 28 except that a material of the central portion (Si powder) was used as the first negative electrode active material in the step of producing the negative electrode.

The charge and discharge efficiency of the battery obtained as described above was evaluated as follows. First, constant current charge was performed at a constant current of 0.2 C until the battery voltage reached 4.40 V, thereafter constant voltage charge was performed at a constant voltage of 4.40 V until the current value reached 0.025 C, in an environment of 23° C. Subsequently, the battery was discharged at a constant current of 0.2 C until the battery voltage reached 3.0 V. The charge and discharge efficiency ((discharge capacity/charge capacity)×100(%)) at the 1st cycle was calculated from the charge capacity and the discharge capacity at this time. The results are provided in Tables 2, 4, 6, and 8. It should be understood that the charge and discharge efficiency of the batteries of Examples 1 to 25 and Comparative Examples 2 and 3 is expressed as relative values with the charge and discharge efficiency of Comparative Example 1 being considered as 100%. The charge and discharge efficiency of the battery of Example 26 is expressed as a relative value with the charge and discharge efficiency of Comparative Example 4 being considered as 100%. The charge and discharge efficiency of the battery of Example 27 is expressed as a relative value with the charge and discharge efficiency of Comparative Example 5 being considered as 100%. The charge and discharge efficiency of the battery of Example 28 is expressed as a relative value with the charge and discharge efficiency of Comparative Example 6 being considered as 100%.

The charge and discharge efficiency of the battery obtained as described above was evaluated as follows. First, using the battery in which the above-described charge and discharge in the first cycle had been completed, charge and discharge in the 2nd to 100th cycles were performed in an environment of 23° C. as described below. Constant current charge was performed at a constant current of 0.5 C until the battery voltage reached 4.40 V, thereafter constant voltage charge was performed at a constant voltage of 4.40 V until the current value reached 0.025 C, and then discharge was performed at a constant current of 0.5 C until the battery voltage reached 3.0 V. This charge and discharge were performed up to 100 cycles. Next, cycle characteristics were calculated using the following Formula.

Cycle characteristics[%]=(discharge capacity at 100th cycle/discharge capacity at 2nd cycle)×100

The results are provided in Tables 2, 4, 6, and 8. It should be understood that the cycle characteristics of the batteries of Examples 1 to 25 and Comparative Examples 2 and 3 are expressed as relative values with the cycle characteristics of Comparative Example 1 being considered as 100%. The cycle characteristics of the battery of Examples 26 is expressed as a relative value with the cycle characteristics of Comparative Example 4 being considered as 100%. The cycle characteristics of the battery of Examples 27 is expressed as a relative value with the cycle characteristics of Comparative Example 5 being considered as 100%. The cycle characteristics of the battery of Examples 28 is expressed as a relative value with the cycle characteristics of Comparative Example 6 being considered as 100%.

Tables 1 and 2 indicate the configurations and evaluation results of the batteries of Examples 1 to 25 and Comparative Examples 1 to 3.

TABLE 1

| | First negative electrode active material | | | | | | | |
|---|---|---|---|---|---|---|---|---|
| | Central portion material | | Covering portion | | | | Conductive material | |
| | | | First compound | | Precursor of second compound | | | |
| | Type | Mixing ratio [mass %] | Type | Mixing ratio [mass %] | Type | Mixing ratio [mass %] | Type | Mixing ratio [mass %] |
| Example 1 | Si | 98 | SPA | 1 | $3.5SiO_2 \cdot Li_2O$ | 1 | — | — |
| Example 2 | Si | 98.9 | SPA | 0.1 | $3.5SiO_2 \cdot Li_2O$ | 1 | — | — |
| Example 3 | Si | 94 | SPA | 5 | $3.5SiO_2 \cdot Li_2O$ | 1 | — | — |
| Example 4 | Si | 89 | SPA | 10 | $3.5SiO_2 \cdot Li_2O$ | 1 | — | — |
| Example 5 | Si | 98.9 | SPA | 1 | $3.5SiO_2 \cdot Li_2O$ | 0.1 | — | — |
| Example 6 | Si | 94 | SPA | 1 | $3.5SiO_2 \cdot Li_2O$ | 5 | — | — |
| Example 7 | Si | 89 | SPA | 1 | $3.5SiO_2 \cdot Li_2O$ | 10 | — | — |
| Example 8 | Si | 98 | KPA | 1 | $3.5SiO_2 \cdot Li_2O$ | 1 | — | — |
| Example 9 | Si | 98 | PAA | 1 | $3.5SiO_2 \cdot Li_2O$ | 1 | — | — |
| Example 10 | Si | 98 | SPA | 1 | $0.5SiO_2 \cdot Li_2O$ | 1 | — | — |
| Example 11 | Si | 98 | SPA | 1 | $7.5SiO_2 \cdot Li_2O$ | 1 | — | — |
| Example 12 | Si | 98 | SPA | 1 | $3.5SiO_2 \cdot Na_2O$ | 1 | — | — |
| Example 13 | Si | 98 | SPA | 1 | $3.5SiO_2 \cdot K_2O$ | 1 | — | — |
| Example 14 | $SiTi_{0.01}$ | 98 | SPA | 1 | $3.5SiO_2 \cdot Li_2O$ | 1 | — | — |
| Example 15 | $SiO_x$ | 98 | SPA | 1 | $3.5SiO_2 \cdot Li_2O$ | 1 | — | — |
| Example 16 | Si | 97.99 | SPA | 1 | $3.5SiO_2 \cdot Li_2O$ | 1 | MWCNT | 0.01 |
| Example 17 | Si | 97 | SPA | 1 | $3.5SiO_2 \cdot Li_2O$ | 1 | MWCNT | 1 |
| Example 18 | Si | 93 | SPA | 1 | $3.5SiO_2 \cdot Li_2O$ | 1 | MWCNT | 5 |
| Example 19 | Si | 88 | SPA | 1 | $3.5SiO_2 \cdot Li_2O$ | 1 | MWCNT | 10 |
| Example 20 | Si | 78 | SPA | 1 | $3.5SiO_2 \cdot Li_2O$ | 1 | MWCNT | 20 |
| Example 21 | Si | 97.999 | SPA | 1 | $3.5SiO_2 \cdot Li_2O$ | 1 | SWCNT | 0.001 |
| Example 22 | Si | 97 | SPA | 1 | $3.5SiO_2 \cdot Li_2O$ | 1 | CB | 1 |
| Example 23 | Si | 93 | SPA | 1 | $3.5SiO_2 \cdot Li_2O$ | 1 | scaly graphite | 5 |
| Example 24 | Si | 98 | SPA | 1 | $3.5SiO_2 \cdot Li_2O$ | 1 | — | — |
| Example 25 | Si | 98 | SPA | 1 | $3.5SiO_2 \cdot Li_2O$ | 1 | — | — |
| Comparative Example 1 | Si | 100 | — | — | — | — | — | — |
| Comparative Example 2 | Si | 98 | SPA | 2 | — | — | — | — |
| Comparative Example 3 | Si | 98 | — | — | $3.5SiO_2 \cdot Li_2O$ | 2 | — | — |

TABLE 2

| | First negative electrode active material Mixing ratio [mass %] | Second negative electrode active material | | Negative electrode binder | | Cycle characteristics [%] | Charge and discharge efficiency [%] |
|---|---|---|---|---|---|---|---|
| | | Type | Mixing ratio [mass %] | Type | Mixing ratio [mass %] | | |
| Example 1 | 10 | MCMB | 86 | PVDF | 3 | 143 | 102.9 |
| Example 2 | 10 | MCMB | 86 | PVDF | 3 | 142 | 102.9 |
| Example 3 | 10 | MCMB | 86 | PVDF | 3 | 145 | 102.7 |
| Example 4 | 10 | MCMB | 86 | PVDF | 3 | 145 | 102.3 |
| Example 5 | 10 | MCMB | 86 | PVDF | 3 | 142 | 101.7 |
| Example 6 | 10 | MCMB | 86 | PVDF | 3 | 143 | 103.5 |
| Example 7 | 10 | MCMB | 86 | PVDF | 3 | 144 | 104.0 |
| Example 8 | 10 | MCMB | 86 | PVDF | 3 | 142 | 102.8 |
| Example 9 | 10 | MCMB | 86 | PVDF | 3 | 145 | 103.1 |
| Example 10 | 10 | MCMB | 86 | PVDF | 3 | 141 | 102.7 |
| Example 11 | 10 | MCMB | 86 | PVDF | 3 | 141 | 103.2 |
| Example 12 | 10 | MCMB | 86 | PVDF | 3 | 140 | 102.8 |
| Example 13 | 10 | MCMB | 86 | PVDF | 3 | 140 | 102.7 |
| Example 14 | 10 | MCMB | 86 | PVDF | 3 | 152 | 103.2 |
| Example 15 | 10 | MCMB | 86 | PVDF | 3 | 157 | 100.6 |
| Example 16 | 10 | MCMB | 86 | PVDF | 3 | 145 | 102.9 |
| Example 17 | 10 | MCMB | 86 | PVDF | 3 | 149 | 103.0 |
| Example 18 | 10 | MCMB | 86 | PVDF | 3 | 152 | 103.0 |
| Example 19 | 10 | MCMB | 86 | PVDF | 3 | 153 | 103.1 |
| Example 20 | 10 | MCMB | 86 | PVDF | 3 | 154 | 103.1 |
| Example 21 | 10 | MCMB | 86 | PVDF | 3 | 145 | 103.0 |
| Example 22 | 10 | MCMB | 86 | PVDF | 3 | 145 | 103.0 |

TABLE 2-continued

|  | First negative electrode active material Mixing ratio [mass %] | Second negative electrode active material | | Negative electrode binder | | Cycle characteristics [%] | Charge and discharge efficiency [%] |
| --- | --- | --- | --- | --- | --- | --- | --- |
|  |  | Type | Mixing ratio [mass %] | Type | Mixing ratio [mass %] |  |  |
| Example 23 | 10 | MCMB | 86 | PVDF | 3 | 146 | 103.1 |
| Example 24 | 10 | MCMB | 86 | PI | 3 | 147 | 103.2 |
| Example 25 | 10 | MCMB | 86 | AR | 3 | 143 | 102.9 |
| Comparative Example 1 | 10 | MCMB | 86 | PVDF | 3 | 100 | 100.0 |
| Comparative Example 2 | 10 | MCMB | 86 | PVDF | 3 | 128 | 99.9 |
| Comparative Example 3 | 10 | MCMB | 86 | PVDF | 3 | 99 | 102.9 |

Tables 3 and 4 indicate the configurations and evaluation results of the batteries of Example 26 and Comparative Example 4.

TABLE 3

| | First negative electrode active material | | | | | | | |
| --- | --- | --- | --- | --- | --- | --- | --- | --- |
| | Central portion material | | Covering portion | | | | | |
| | | | First compound | | Precursor of second compound | | Conductive material | |
| | Type | Mixing ratio [mass %] | Type | Mixing ratio [mass %] | Type | Mixing ratio [mass %] | Type | Mixing ratio [mass %] |
| Example 26 | Si | 98 | SPA | 1 | $3.5SiO_2 \cdot Li_2O$ | 1 | — | — |
| Comparative Example 4 | Si | 100 | — | — | — | — | — | — |

TABLE 4

|  | First negative electrode active material Mixing ratio [mass %] | Second negative electrode active material | | Negative electrode binder | | Cycle characteristics [%] | Charge and discharge efficiency [%] |
| --- | --- | --- | --- | --- | --- | --- | --- |
|  |  | Type | Mixing ratio [mass %] | Type | Mixing ratio [mass %] |  |  |
| Example 26 | 20 | MCMB | 76 | PVDF | 3 | 145 | 102.9 |
| Comparative Example 4 | 20 | MCMB | 76 | PVDF | 3 | 100 | 100.0 |

Tables 5 and 6 indicate the configurations and evaluation results of the batteries of Example 27 and Comparative Example 5.

TABLE 5

| | First negative electrode active material | | | | | | | |
|---|---|---|---|---|---|---|---|---|
| | Central portion material | | Covering portion | | | | | |
| | | | First compound | | Precursor of second compound | | Conductive material | |
| | Type | Mixing ratio [mass %] | Type | Mixing ratio [mass %] | Type | Mixing ratio [mass %] | Type | Mixing ratio [mass %] |
| Example 27 | Si | 98 | SPA | 1 | $3.5SiO_2 \cdot Li_2O$ | 1 | — | — |
| Comparative Example 5 | Si | 100 | — | — | — | — | — | — |

TABLE 6

| | First negative electrode active material Mixing ratio [mass %] | Second negative electrode active material | | Negative electrode binder | | Cycle characteristics [%] | Charge and discharge efficiency [%] |
|---|---|---|---|---|---|---|---|
| | | Type | Mixing ratio [mass %] | Type | Mixing ratio [mass %] | | |
| Example 27 | 30 | MCMB | 66 | PVDF | 3 | 139 | 102.9 |
| Comparative Example 5 | 30 | MCMB | 66 | PVDF | 3 | 100 | 100.0 |

Tables 7 and 8 indicate the configurations and evaluation results of the batteries of Example 28 and Comparative Example 6.

TABLE 7

| | First negative electrode active material | | | | | | | |
|---|---|---|---|---|---|---|---|---|
| | Central portion material | | Covering portion | | | | | |
| | | | First compound | | Precursor of second compound | | Conductive material | |
| | Type | Mixing ratio [mass %] | Type | Mixing ratio [mass %] | Type | Mixing ratio [mass %] | Type | Mixing ratio [mass %] |
| Example 28 | Si | 98 | SPA | 1 | $3.5SiO_2 \cdot Li_2O$ | 1 | — | — |
| Comparative Example 6 | Si | 100 | — | — | — | — | — | — |

TABLE 8

| | First negative electrode active material Mixing ratio [mass %] | Second negative electrode active material | | Negative electrode binder | | Cycle characteristics [%] | Charge and discharge efficiency [%] |
|---|---|---|---|---|---|---|---|
| | | Type | Mixing ratio [mass %] | Type | Mixing ratio [mass %] | | |
| Example 28 | 94 | — | — | PVDF | 5 | 123 | 105.8 |
| Comparative Example 6 | 94 | — | — | PVDF | 5 | 100 | 100.0 |

The formal names of the materials represented by abbreviations in Tables 1 to 8 are as follows.

SPA: Sodium polyacrylate
KPA: Potassium polyacrylate
PAA: Polyacrylamide
MWCNT: Multi-wall carbon nanotube
SWCNT: Single-wall carbon nanotube
CB: Carbon black
PI: Polyimide
AR: Aramid The following can be seen from Tables 1 to 8.

A battery in which the covering portion contains the first compound (sodium polyacrylate) and the second compound (siloxane compound) (Example 1) improves cycle characteristics and initial charge and discharge efficiency, as compared with a battery in which the covering portion contains neither the first compound nor the second compound (Comparative Example 1).

A battery in which the covering portion contains only the first compound (Comparative Example 2) improves cycle characteristics but does not improve initial charge and discharge efficiency, as compared with the battery in which the covering portion contains neither the first compound nor the second compound (Comparative Example 1).

A battery in which the covering portion contains only the second compound (Comparative Example 3) improves initial charge and discharge efficiency but does not improve cycle characteristics, as compared with the battery in which the covering portion contains neither the first compound nor the second compound (Comparative Example 1).

The battery in which the covering portion contains only the second compound (Comparative Example 3) does not exhibit the effect of improving cycle characteristics as described above; whereas, the battery in which the covering portion contains the second compound together with the first compound (Example 1) improves cycle characteristics, as compared with the battery in which the covering portion contains only the first compound (Comparative Example 2).

A battery in which the content of the first compound in the first negative electrode active material is 0.1 mass % or more and 10 mass % or less (Examples 1 to 4) provides good cycle characteristics and initial charge and discharge efficiency.

A battery in which the content of a precursor of the second compound in the first negative electrode active material is 0.1 mass % or more and 10 mass % or less (Examples 1 and 5 to 7) provides good cycle characteristics and initial charge and discharge efficiency.

A battery in which the covering portion contains potassium polyacrylate or polyacrylamide as the first compound (Examples 8 and 9) also improves cycle characteristics and initial charge and discharge efficiency, as compared with the battery in which the covering portion contains neither the first compound nor the second compound (Comparative Example 1).

A battery in which lithium silicate ($nSiO_2 \cdot Li_2O$, n=0.5 to 7.5) is used as a precursor of the second compound (Examples 1, 10 and 11) provides good cycle characteristics and initial charge and discharge efficiency.

A battery in which lithium silicate ($3.5SiO_2 \cdot Li_2O$), sodium silicate ($3.5SiO_2 \cdot Na_2O$), or potassium silicate ($3.5SiO_2 \cdot K_2O$) is used as a precursor of the second compound in the step of producing composite secondary particles (Examples 1, 12, and 13) provides good cycle characteristics and initial charge and discharge efficiency.

When the covering portion contains the first compound and the second compound, good cycle characteristics and initial charge and discharge efficiency can be obtained regardless of a material of the central portion (Si powder, $SiTi_{0.01}$ powder, and $SiO_x$ powder) (Examples 14 and 15).

A battery in which the covering portion further contains a conductive material (MWCNT and SWCNT) in a range of 0.001 mass % or more and 20 mass % or less (Examples 16 to 21) further improves cycle characteristics, as compared with a battery in which the covering portion does not contain a conductive material (Example 1).

A battery in which the covering portion contains carbon black or scaly graphite as a conductive material (Examples 22 and 23) also provides good cycle characteristics and initial charge and discharge efficiency similarly to a battery in which the covering portion contains MWCNT and SWCNT as conductive materials (Examples 16 to 21).

When the covering portion contains the first compound and the second compound, good cycle characteristics and initial charge and discharge efficiency can be obtained regardless of the type of the negative electrode binder (polyvinylidene difluoride, polyimide, and aramid) (Examples 1, 24, and 25).

When the covering portion contains the first compound and the second compound, good cycle characteristics and initial charge and discharge efficiency can be obtained regardless of the content of the first negative electrode active material in the negative electrode active material layer (Examples 1, 26, and 27, and Comparative Examples 1, 4, and 5).

When the covering portion contains the first compound and the second compound, both of a battery in which a negative electrode active material contains the first negative electrode active material and the second negative electrode active material, and a battery in which the negative electrode active material contains only the first negative electrode active material, the effect of improving cycle characteristics and initial charge and discharge efficiency can be obtained (Examples 1 and 28, and Comparative Examples 1 and 6).

In the foregoing, the embodiments of the present disclosure have been specifically described. The present disclosure, however, is not limited to the embodiments set forth hereinabove, and various modifications based on a technical idea of the present disclosure may be made.

For example, the configurations, the methods, the steps, the shapes, the materials, the values, and the like exemplified in the embodiments are merely examples, and configurations, methods, steps, shapes, materials, values, and the like that are different from these examples, may be employed as necessary. The configurations, the methods, the steps, the shapes, the materials, the values, and the like in the embodiments may be implemented in combination without departing from the spirit of the present disclosure.

The chemical formulas of the compounds and the like exemplified in the embodiments are considered representative, and are not limited to the listed valences and the like, as long as the chemical formulas have general names for the same compounds. In the numerical ranges listed in a stepwise manner in the embodiments, the upper limit value or the lower limit value of the numerical range in a certain stage may be replaced with the upper limit value or the lower limit value of the numerical range in another stage. For the materials exemplified in the embodiments, one may be used singly, or two or more may be used in combination unless otherwise specified.

In the embodiments, the laminated type battery has been described as an example, but the shape of the battery is not limited thereto, and the present disclosure may also be applied to batteries having various shapes, such as cylindrical-type battery, a square-type battery, a coin-type battery, and a button-type battery. Furthermore, the present disclosure may also be applied to a flexible battery or the like mounted on a wearable terminal such as a smartwatch and a head-mounted display.

In the embodiment, an example in which the present disclosure is applied to a wound battery has been described. However, the structure of the battery is not limited thereto, and for example, the present disclosure may also be applied to a stacked type batteries in which a positive electrode and a negative electrode are stacked with a separator interposed therebetween, a battery in which a positive electrode and a negative electrode are folded with a separator interposed therebetween, or the like.

In the embodiment, the case in which the negative electrode active material contains a plurality of the first negative electrode active material particles 30 and a plurality of the second negative electrode active material particles 40 has been described, but the negative electrode active material may be formed to contain only a plurality of the first negative electrode active material particles 30. Also in this case, the effect of improving cycle characteristics and charge and discharge efficiency (for example, initial charge and discharge efficiency) may be obtained.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A negative electrode active material comprising
a plurality of first negative electrode active material particles each including:
a central portion including silicon; and
a covering portion provided on a surface of the central portion, the covering portion including a (meth)acrylic acid-based polymer and a compound having a siloxane bond,
wherein the (meth)acrylic acid-based polymer includes at least one of poly(meth)acrylate or a derivative of poly(meth)acrylic acid.

2. The negative electrode active material according to claim 1, wherein the plurality of first negative electrode active material particles are substantially in contact with each other to form a composite particle.

3. The negative electrode active material according to claim 1, wherein
a content of the poly(meth)acrylate in each of the first negative electrode active material particles is from 0.1 mass % to 10 mass %, and
a content of the compound having a siloxane bond in each of the first negative electrode active material particles is from 0.1 mass % to 10 mass %.

4. The negative electrode active material according to claim 2, wherein
a content of the poly(meth)acrylate in each of the first negative electrode active material particles is from 0.1 mass % to 10 mass %, and
a content of the compound having a siloxane bond in each of the first negative electrode active material particles is from 0.1 mass % to 10 mass %.

5. The negative electrode active material according to claim 1, wherein the covering portion further includes a conductive material.

6. The negative electrode active material according to claim 2, wherein the covering portion further includes a conductive material.

7. The negative electrode active material according to claim 3, wherein the covering portion further includes a conductive material.

8. The negative electrode active material according to claim 4, wherein the covering portion further includes a conductive material.

9. The negative electrode active material according to claim 5, wherein a content of the conductive material in each of the first negative electrode active material particles is from 0.001 mass % to 10 mass %.

10. The negative electrode active material according to claim 1, further comprising a plurality of second negative electrode active material particles each including a carbon material.

11. The negative electrode active material according to claim 2, further comprising a plurality of second negative electrode active material particles each including a carbon material.

12. The negative electrode active material according to claim 3, further comprising a plurality of second negative electrode active material particles each including a carbon material.

13. The negative electrode active material according to claim 4, further comprising a plurality of second negative electrode active material particles each including a carbon material.

14. The negative electrode active material according to claim 5, further comprising a plurality of second negative electrode active material particles each including a carbon material.

15. The negative electrode active material according to claim 9, further comprising a plurality of second negative electrode active material particles each including a carbon material.

16. A negative electrode comprising the negative electrode active material according to claim 1.

17. A secondary battery comprising:
a positive electrode;
a negative electrode; and
an electrolyte,
wherein the negative electrode includes the negative electrode active material according to claim 1.

* * * * *